United States Patent [19]
Ahearn et al.

[11] Patent Number: 5,926,463
[45] Date of Patent: Jul. 20, 1999

[54] METHOD AND APPARATUS FOR VIEWING AND MANAGING A CONFIGURATION OF A COMPUTER NETWORK

[75] Inventors: Michael J. Ahearn, Gorham, Me.; Konstantinos Baryiames; Darryl Black, both of Merrimack, N.H.; Robert A. Ciampa, Andover, Mass.; James Emken, Arlington, Mass.; William Nelson, Auburn, Mass.; Peter J. Sulc, Pepperall, Mass.; Jing Xiang, Westford, Mass.

[73] Assignee: 3Com Corporation, Santa Clara, Calif.

[21] Appl. No.: 08/943,769

[22] Filed: Oct. 6, 1997

[51] Int. Cl.⁶ .................................................. H04L 12/56
[52] U.S. Cl. ........................ 370/254; 370/410; 370/451
[58] Field of Search .................... 370/254, 255, 370/400, 401, 402, 403, 404, 389, 390, 331

[56] References Cited

U.S. PATENT DOCUMENTS

| | | | |
|---|---|---|---|
| 5,274,631 | 12/1993 | Bhardwaj | 370/401 |
| 5,487,065 | 1/1996 | Acampora et al. | 370/331 |
| 5,515,376 | 5/1996 | Murthy et al. | 370/402 |
| 5,818,842 | 10/1998 | Burwell et al. | 370/397 |

*Primary Examiner*—Huy D. Vu
*Assistant Examiner*—Alexander Boakye
*Attorney, Agent, or Firm*—McGlew and Tuttle

[57] ABSTRACT

A method and apparatus for viewing a configuration of a computer network by polling a plurality of switches and routers present in the network to obtain copies of information stored in databases on the switches and routers. The present invention determines from this combined database is the status of the links, switches and routers, as well as uses software tools to determine the status of the network and its devices. The devices are then graphically displayed according to physical connectivity and status. Each status being displayed differently.

24 Claims, 16 Drawing Sheets

FIND FIRST HOP ROUTER

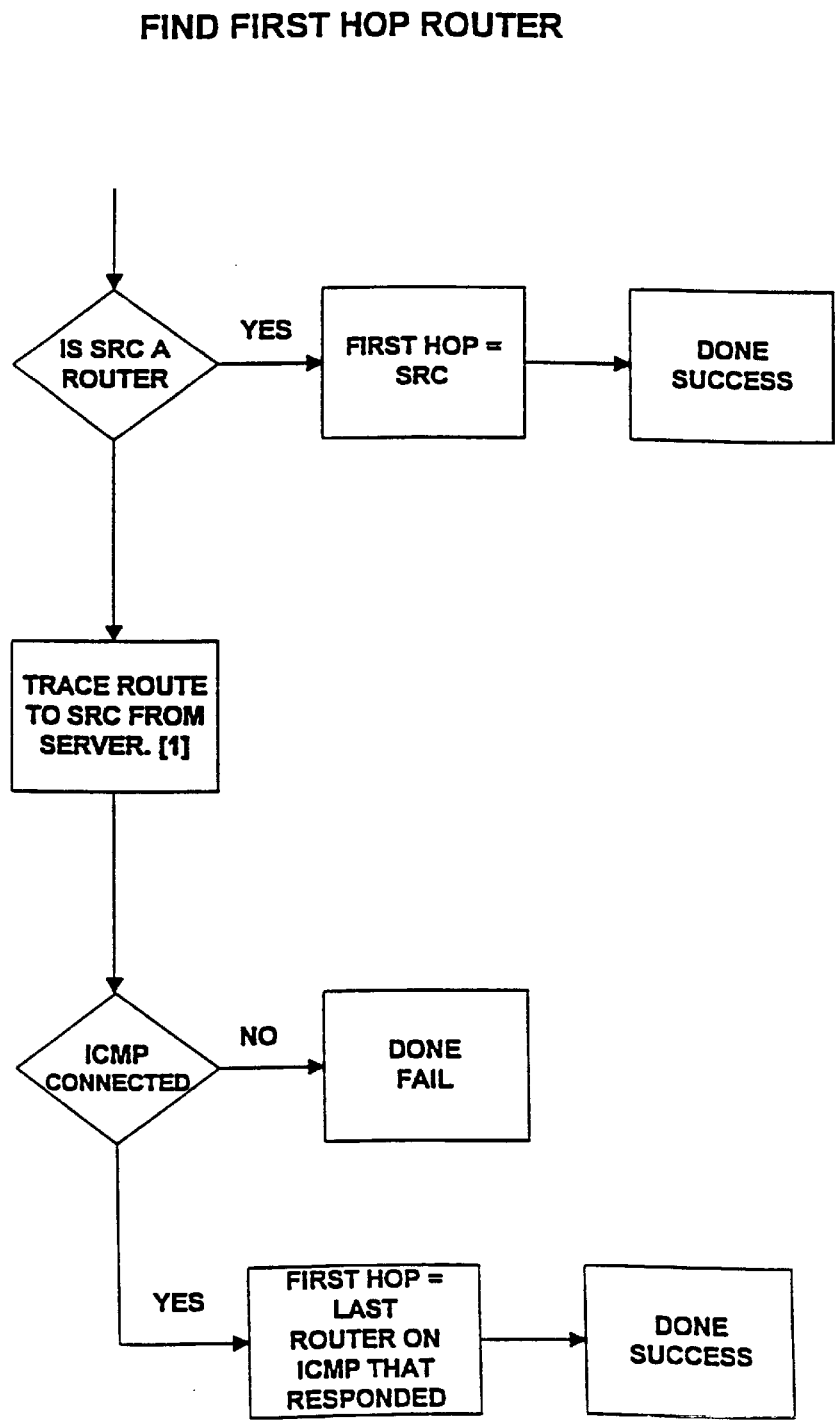

Fig. 9    LAYER 3 Discovery Algorithm

1. Given: a set of network nodes...
The following is the algorithm
to do a FDDI topology map.

A map consisting of 6032 objects (nodes and connections) as placed by the radial place algorithm.

A detailed view of a section of Fig. 2.

METHOD AND APPARATUS FOR VIEWING AND MANAGING A CONFIGURATION OF A COMPUTER NETWORK

FIELD OF THE INVENTION

The present invention relates to a multiple view network management tool for managing a network as a system. In particular a plurality of workstations are in communication with each other through a plurality of links, a plurality of switches and a plurality of routers. Data is collected from the switches and routers and used to view and manage the network as a system.

BACKGROUND OF THE INVENTION

Computer networks are increasing in size and complexity. When only two workstations are in communication with each other, data transfer, synchronization, and a common language or data format is relatively simple to establish. When more than two workstations are connected, coordination, addressing, and identification problems become more complex. As the number of workstations increases, additional hardware is often needed. The hardware is used to coordinate the different requirements that need to be fulfilled in order for successful communication to take place.

One long-standing attempt at breaking up the complexities of networking is the OSI (open systems interconnection) Seven Layer Reference Model. This model represents a network as seven layers:

Application—Layer 7

Presentation—Layer 6

Session—Layer 5

Transport—Layer 4

Network—Layer 3

Datalink—Layer 2

Physical—Layer 1.

This seven layer model has become the de facto standard for networking; it segments functionality by layer and makes network construction more module with interchangeable parts. This model is widely referenced to the point that network managers refer to network problems as being a layer 3 (network layer) problem or a layer 2 (datalink layer) problem. Layer 3 and layer 2 are particularly important layers for determining overall network health; subsequently a network manager spends much of his time managing these layers.

When the number of workstations increases to above approximately 5, or especially 10, hardware is needed to manage all of the data traffic. All of the workstations are usually provided with a link to a hardware device known as a concentrator. The plurality of workstations communicate with the other plurality of workstations over these links and through the concentrator. One of the most basic functions of a concentrator is for the concentrator to function as a repeater.

Each workstation communicates by sending data in frames, where the frame has a destination MAC address. All network devices, such as those that allow a workstation to communicate over a network, are assigned a unique MAC address. The frame with the destination MAC address is sent from the workstation over a link to the repeater. A repeater takes the frame received on one link, and sends a frame out on all the other links. Each workstation connected to the repeater monitors its respective link, and when a frame arrives that has a destination MAC address that matches the workstations MAC address, the workstation reads the frame and processes the frame internally.

Once the number of workstations largely increases, for example beyond 100, or the amount of traffic through the concentrator becomes excessive, a concentrator including a switch, is used. Such a switch has more intelligence than a repeater. The switch looks at the destination address of each frame received on a link, and then based on information contained in the switch, the switch only forwards the frame onto the link, or links, where the destination MAC address exists. The switch can contain this information in a MAC address look-up table, and this look-up table can either be created by a system operator, or the switch can learn which MAC addresses are on a specific link, by reading source addresses on frames received over that specific link (build a look-up table). Other information, such as the quantity of frames received or transmitted onto a link, as well as the size, type and quality of frames can also be recorded by the switch. This information is stored as data in a database.

A repeater is usually used to group together a small number of workstations into what is often called a Local Area Network (LAN), with a switch connecting several LAN's. In this way, the number of workstations that are able to communicate with each other can be increased tremendously, without each frame having to be sent to each workstation. This cuts down on traffic and allows frames to be more quickly sent from one workstation to another.

Presently the number of workstations which are to be connected together, particularly in large companies with locations in many different cities, and several buildings in each of those cities, has caused the amount of traffic to overwhelm repeaters and switches. Therefore, higher level network coordination is required.

An Internet Protocol (IP) has been devised for coordinating such a large number of individual workstations, which often spread out in groups over a large geographical area. This Internet protocol uses an IP address in addition to the MAC address.

Routers are then provided which operate in a manner somewhat similar to switches, but instead read the IP address of a packet. Such a packet is formed of one or more frames. When a router receives a packet, it reads the IP address, and then based on internal information, forwards the packet to a specific port or ports. These ports are connected to links which can then either be connected to other routers in the network, or to, switches, repeaters or individual workstations depending on the how the router is configured.

A packet going from one workstation to another, may have to pass over links, and through several repeaters, switches and routers before it reaches its destination workstation. Also some packets may be destined for more than one workstation, as is often the case when multimedia is transmitted over a large network. The routers must contain information on the proper forwarding of packets, and this information must be updated. When a packet must pass through several routers, and when a workstation in one country wishes to communicate with a workstation several countries away, the packet is transferred from router to router through all of those countries.

Many large companies, have what is now known as Intranets. Intranets act much like the global Internet, but are limited to the workstations of a particular company spread out over many countries, cities and buildings in each city. Tools are needed which allow system operators to determine how to configure the routers and switches, and to identify problems which are causing the network to not operate properly.

SUMMARY AND OBJECTS OF THE INVENTION

It is the primary object of the present invention to provide a method and apparatus for viewing the configuration of a computer network, especially an Intranet of a large company. The method of the present invention polls or collects the database information from the switches and routers of the Intranet. These databases are combined and information is determined or calculated from these databases to determine the status, configuration and connectivity of the individual workstations, links, switches and routers. Some of the parameters that are determined or are calculated, include bandwidth utilization, congestion, Quality of Service (QOS), error rates, and actual and switched connections between the various elements of the network.

This information is displayed in a graphic view, where the appearance of the individual elements represents the status or configuration of the individual elements. Also the relative positioning, and the connections between elements in the graphic view represent the connectivity relationships of the actual elements in the actual network.

Another object of the present invention is to combine different types of status information into a single view.

Management of layers 3 and 2 is greatly facilitated by having an accurate picture of the network. Network pictures give a network manager a reference point of what is connected to what, where each device is in relation to other devices, the location of routers and switches, and the proximity of end notes and end devices.

However, the present invention goes well beyond simple connectivity pictures. The present invention recognizes that the connectivity picture is only one view of the network for network management. The present invention is based additionally on presenting views which are beneficial to a network manager. In addition, the present invention shows each view in context with overlapping views. For example, in a preferred embodiment a multimedia path view of the network is overlaid on the layer 3 (routing) view of the network. Multiple views in context give network managers many ways to view the same network components and their interrelationships in one picture. This provides strong context and focus on interrelationships which is often the route of network problems.

One of the views is an IP path tracing view of the network. This enables the network manager to monitor critical network links in the network, and in particular to see the exact path taken by a packet from one workstation, through the routers to another workstation.

A multimedia path tracing view of the network is also provided which has the ability to monitor the network data flows with the DVMRP (Distance-Vector Multicast Routing Protocol). This provides the network manager with a multimedia view of the network in context with a normal connectivity view. The network manager is then able to see how multimedia packets are passing through the network, in relationship to other views of the network, and thus determine if the receiving of multimedia packets by several workstations is interfering with other operations of the network.

A spanning tree view of the network is also provided. A plurality of switches often contain a plurality of links between themselves to provide redundant links, should a link fail. However, having several active links between two switches, can cause broadcast storms and therefore a spanning tree protocol is typically in operation to remove redundant links and hold them in standby. The spanning tree view of the network allows a network manager to see layer 2 connectivity and any standby links. This view is particularly important in switched networks where switches often get lost or clumped in layer 3 routing connectivity views.

A trunking view of the network is also provided. One of the techniques used to increase the bandwidth between network devices is to load balance data between multiple ports or links. This results in bandwidth summation of all the ports, and essentially a very large bandwidth connection made up of many physical links logically managed as one. The trunking view of the present invention provides a display of trunked links in relation to all the other views.

Some local area networks may organize their workstations in a ring protocol. The present invention provides a ring view of the network showing which workstations are connected in a ring, and their relative positions in that ring.

The present invention also provides a routing connectivity view of the network. While this routing connectivity view is not unique, the feature of this routing connectivity view in context with the other views, provides additional information to a network manager and the combination is unique.

The present invention evaluates the various network views as a composite, in much the same way as a network manager does. For example, one of the fundamental problems of a network is configuration consistency among routing devices within the network. If timers are out-of-synch, or tables are inconsistent, the network often fails or at minimum is handicapped. Because the present invention maintains network views of the network, it can automatically verify certain key configuration consistencies for the network manager, and show inconsistencies in context on the graphic display. This increases problem resolution, often to the point of fixing problems before they are realized by network users.

The system of the present invention is built using client/server technology. The clients can be Java-based, Windows, or Unix applications, which provide access to the network view from any web browser. The server is preferably C++-based and runs on either a Unix or Windows O/S. All network views and network status will be distributed by the server in a hierarchial (in context) fashion, and not as a tabular collection of data which must be assembled appropriately at the client.

This provides methodology for a consistent set of views across the network using a very thin client, very powerful server, and in context hierarchical data. This hierarchical data is expected to be very useful in present and future analysis of computer networks.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 2A–D is a flow chart showing how the information for the IP tracing view is collected, calculated and displayed;

DETAILED DESCRIPTION OF THE PREFERRED EMBODIMENT

Figure 1:
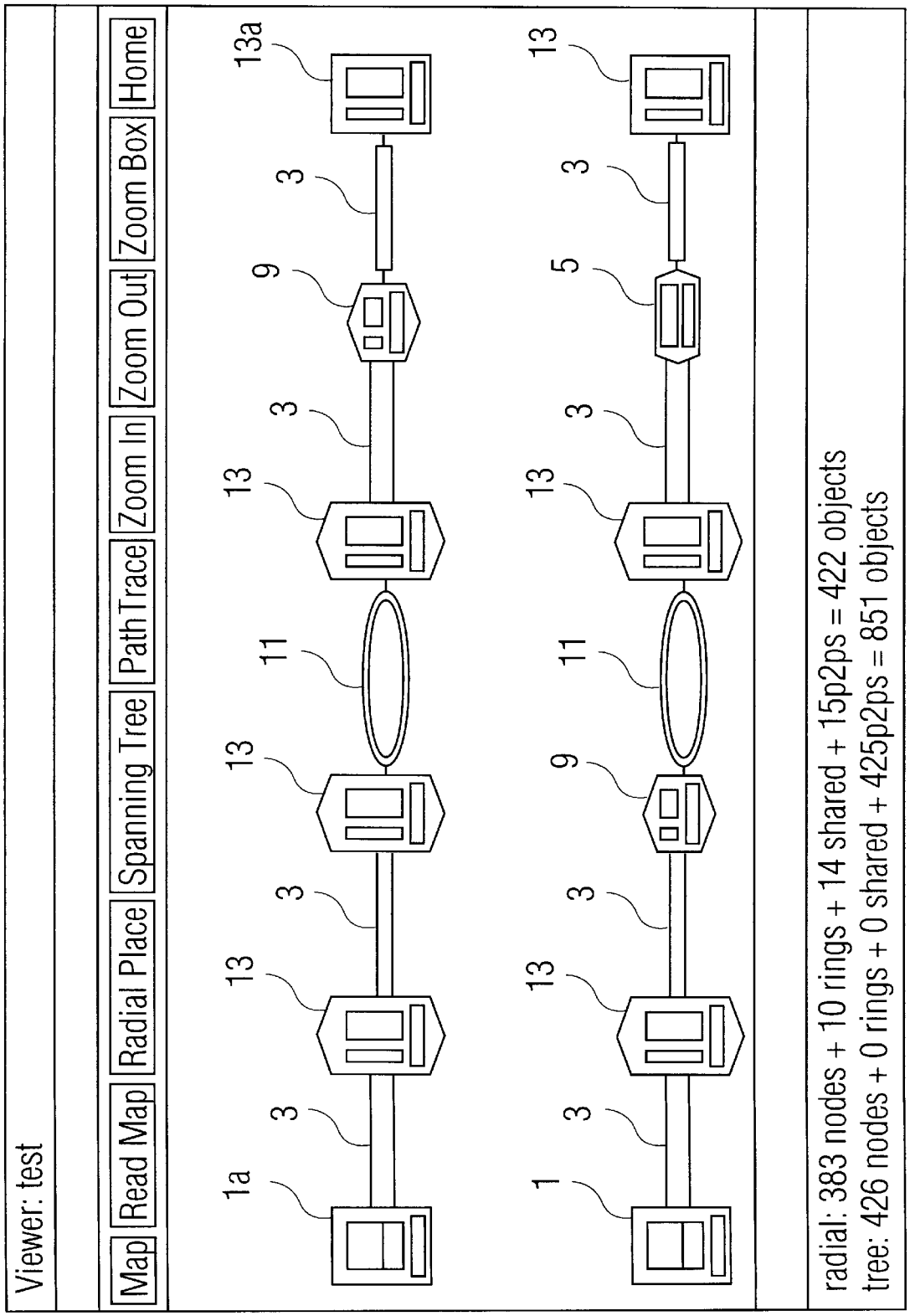
FIG. 1 is an IP path tracing view of the network.
Figure 2A:
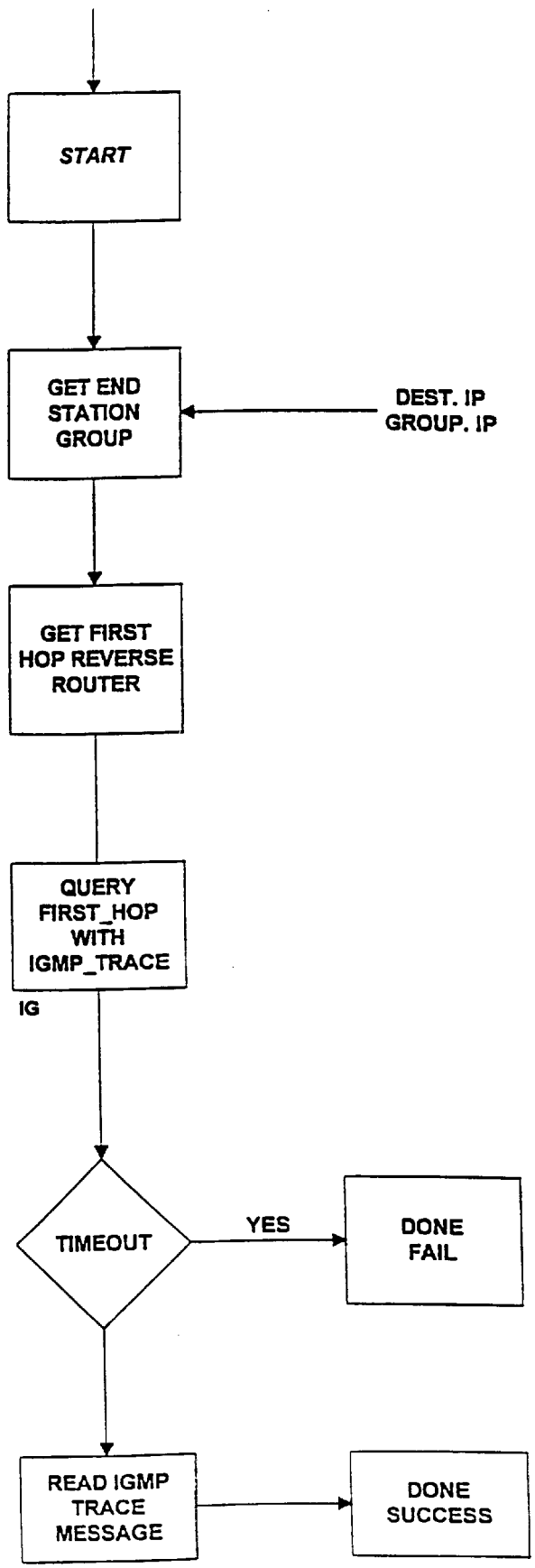
Figure 2B:
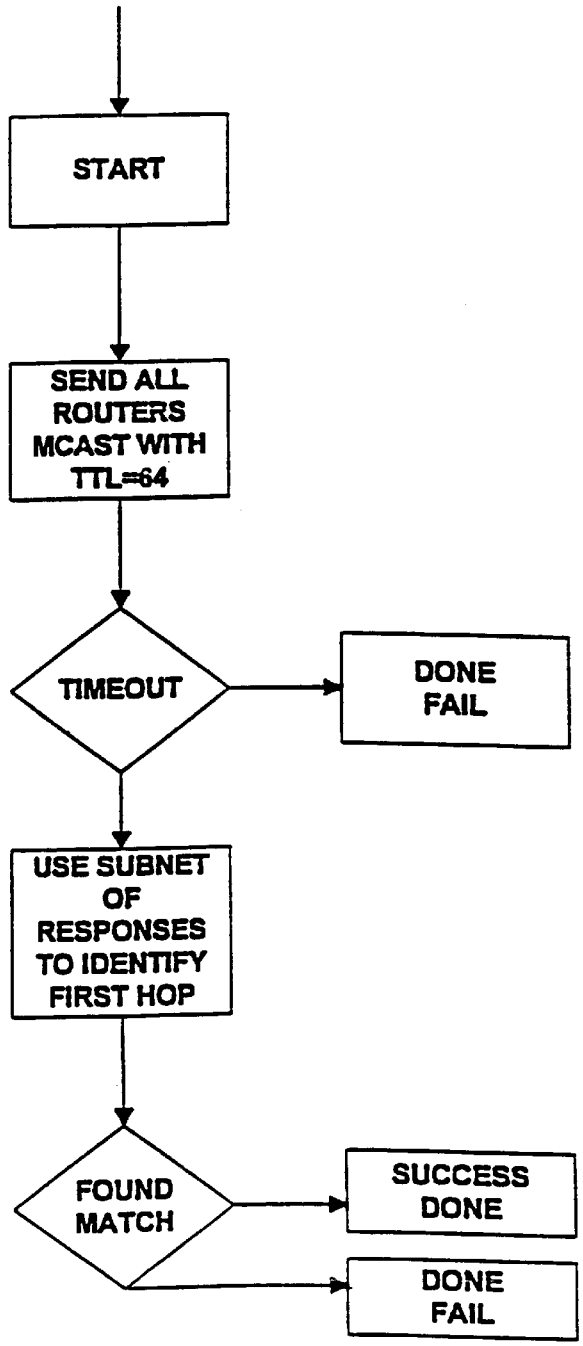
Figure 2C:
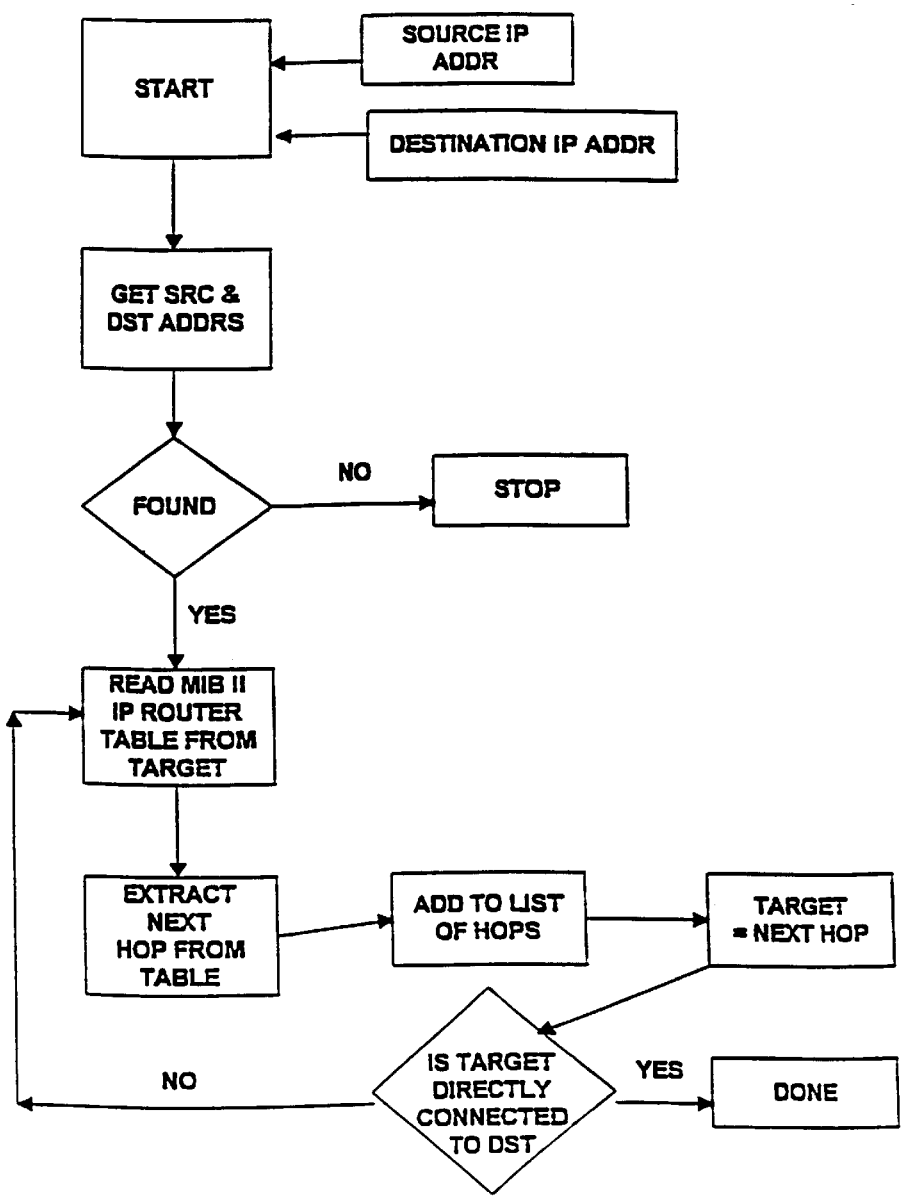

Referring to the drawings, the primary view for this application is a topology view consisting of routers, router interfaces, backbone networks, WAN networks, and network "clouds". A backbone network is a network that directly interconnects two or more routers. A single router interface that connects a campus backbone to a wide area backbone is represented as a WAN network. A network cloud is a group of one or more networks that are not part of the backbone (each network is directly connected to only one router). Starting with a list of the backbone routers, the present invention will poll each routers IP address table along with a few objects from the iftable to obtain the list of interfaces that have configured IP addresses. The resulting list of interfaces is then used to discover the networks to which the router is connected.

Figure 8:
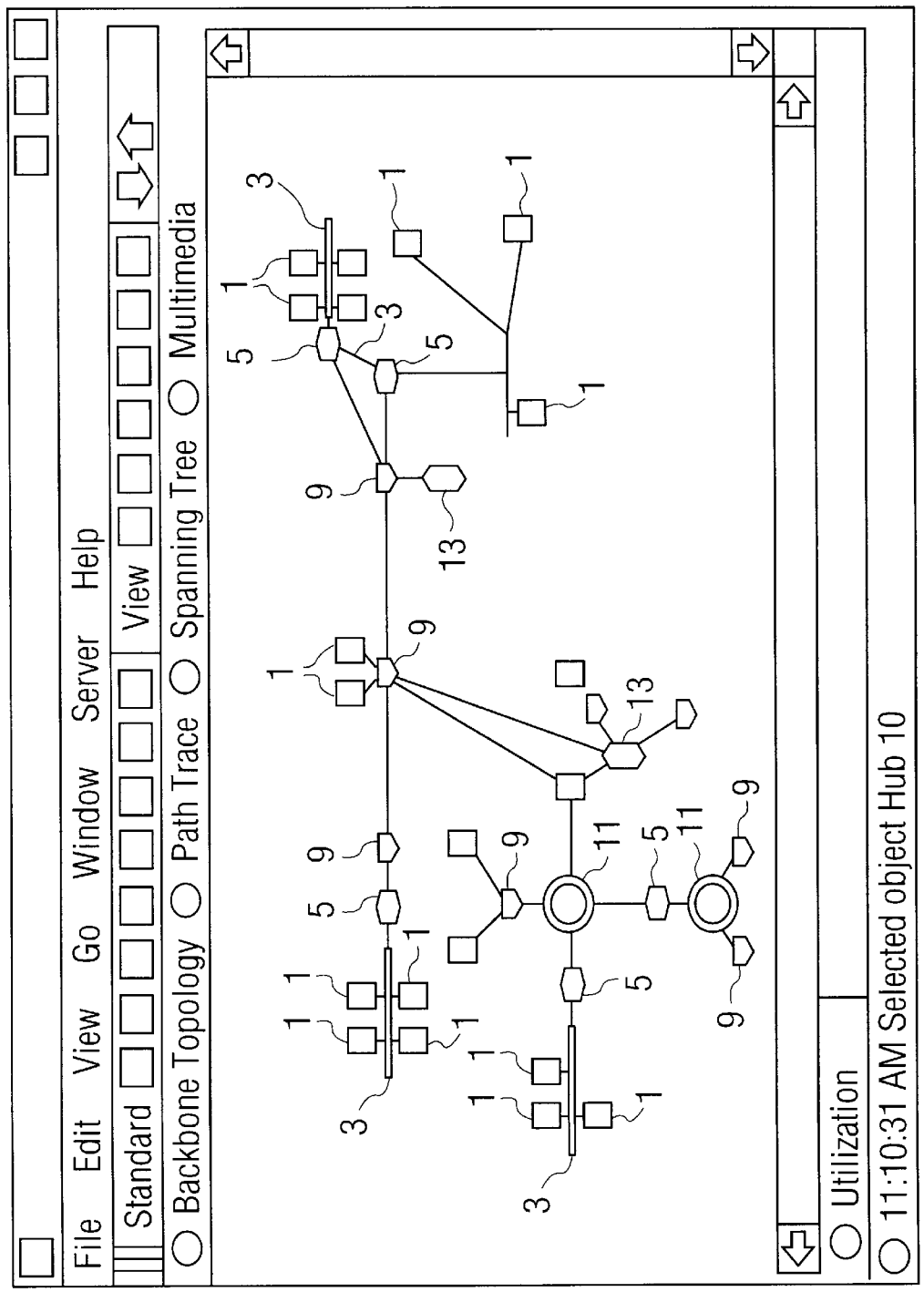
FIG. 8 is a routing overview of the network which can be expanded to show information from the other views.

FIG. 8 shows a routing conductivity view of the network. Individual nodes or workstations 1 are connected to each other, and other devices on the network by links 3. The links 3 can take many different forms such as twisted pair, coaxial cable, and fiberoptic. All these different types of links have different bandwidth capabilities and can also have different physical layer configurations, such as layer 2 collision domain. A switch 5 connects the four workstation 1 in the upper left portion of FIG. 8 to the rest of the network. Another switch 5 connects the four workstations 1 in the upper right portion of FIG. 8 to the rest of the network. And still another switch 5 connects the three workstations 1 in the lower right side of FIG. 8 to the rest of the network, and to the switch 5 connecting the four modules in the upper right. The link 3 connecting the two switches 5 on the right side of FIG. 8, is a trunking link in a preferred embodiment. The user is able to request that trunk links be specifically identified and this link would then have a different appearance than other links which are not trunk links.

Figure 6:
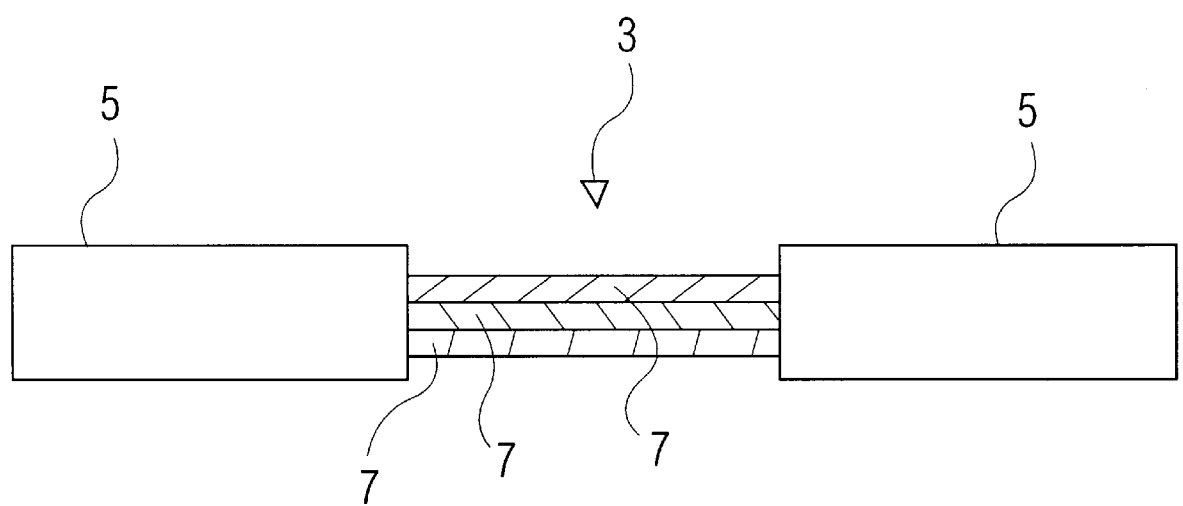
FIG. 6 is a trunking view of the network.

Alternatively the user could request an expanded view of this particular link, as it is shown in FIG. 6. The link in FIG. 6 is a trunk link formed of individual lines 7. The switches 5 on either end of the link treat all of the trunk lines 7 as one link and data is transferred over all of these trunk lines 7 in a substantially parallel form. The individual trunk lines 7 can have different appearances, represented in FIG. 6 by different types of diagonal lines, to show different features or status of the individual trunk lines 7. As an example, one of the trunk lines 7 could be noisy, so that its data rate is much lower. A network supervisor could select the display to show the bandwidth utilization of all the lines 7, or links 3 in a broad overview of the network. The network supervisor would then be able to determine if there were any difficulties on any of the lines or links. In another example, the network supervisor could request to see total available bandwidth, to determine if the adding of additional workstations would cause difficulty.

As also shown in FIG. 8, routers line are shown. In a preferred embodiment, the routers 9 are shown with a shape which has more angles than a switch 5 or a workstation 1. In this preferred embodiment, the more angles the showing of a device has, the more intelligence or processing capability a device has.

FIG. 8 also shows ring network topology 11, in a form of a circle. These are FDDI rings, and can either be single or dual ring topologies. Servers 13 are also shown. A network supervisor is thus allowed view many different devices of the network and observe their connectivity. The network supervisor can also zoom in on a particular link or area of the network and obtain additional information, such as trunk lines present in a link, and link status.

Many times a network supervisor is not concerned with all the devices in a network. Instead one particular workstation 1 may be having difficulty communicating with a particular server 13. In this case, the network administrator, would use the IP view of the network, as shown in FIG. 1. FIG. 1 actually shows two different IP trace views for demonstration purposes. In the top IP trace view, a particular workstation 1a desires to communicate with a particular server 13a. The IP view shows all the devices and links between the particular workstation 1a and the particular server 13a. In the top example in FIG. 1, the links 3 are represented by lines of varying thickness. Depending on the users selection, the thickness of the lines can either represent total available bandwidth, bandwidth utilization, error rates, quality of service, actual data rate, and/or the presence of any trunk lines. As one can see, the connection between the particular workstation 1a and the first server 13, is a particularly thick line, while the next link is a much thinner line. This could indicate to a network supervisor that the second link may be causing congestion and having a bottleneck affect on communications between the particular workstation 1a and the particular server 13a. The top example in FIG. 1 also shows that a ring topology 11, mainly a dual ring topology, is present between the particular workstation 1a and a particular server 13a. In the present invention, in a preferred embodiment, the network supervisor can request identification of each of the individual servers, routers and switches between the particular workstation 1a and the particular server 13a. The network supervisor is then able to obtain information from the devices and analyze any difficulties in communication between the particular workstation 1a and the particular server 13a.

Figure 3:
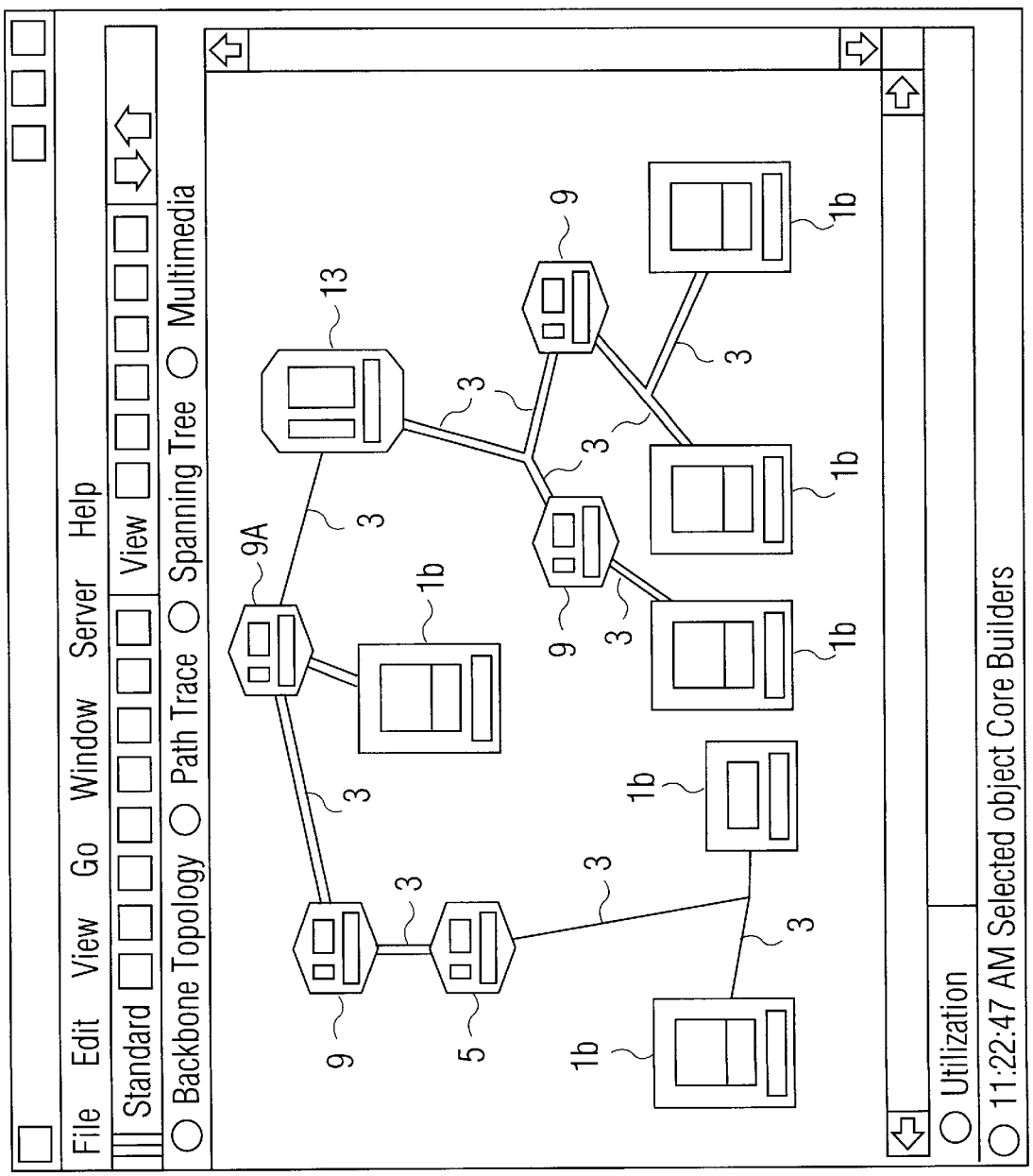
FIG. 3 is a multimedia path tracing view of the network.

A large source of traffic across a network is cause by what is often known as mulitmedi or multicast traffic. This often takes the form of a particular type of programming by one station, which then sends this programming to a plurality of workstations 1. FIG. 3 shows a multicast or multimedia view of a network from a particular router 9a to a plurality of other devices. The multimedia program is sent from the particular router 9a to particular workstations 1b. Each of the workstations 1b has requested from a corresponding switch 5, router 9 or server 13 that packets or frames having a particular address, such as the address for a particular multimedia program, be forwarded to that particular workstation 1b. In effect, the particular workstation 1b requests from the closest switch 5, router 9, or server 13, that it be subscribed to a particular program. If this closest switch 5, router 9 or server 13 is itself not subscribed to a particular program, that device will then request from another device that it be subscribed to that particular program. This continues on until a device is found which already subscribes, to that particular program, such a router 9a.

Such programming often contains video and audio information that is delivered at periodic intervals. This can consume large amounts of bandwidth in a network. Therefore it is very beneficial to the network supervisor to determine which particular workstations 1b are subscribing to a multimedia, or at least multicast transmissions. The network supervisor, in a preferred embodiment, can analyze the individual links 3 in a multicast tree, and the individual devices between the particular workstations 1b and the particular router 9a which provides the source of the multimedia transmission.

Figure 4:
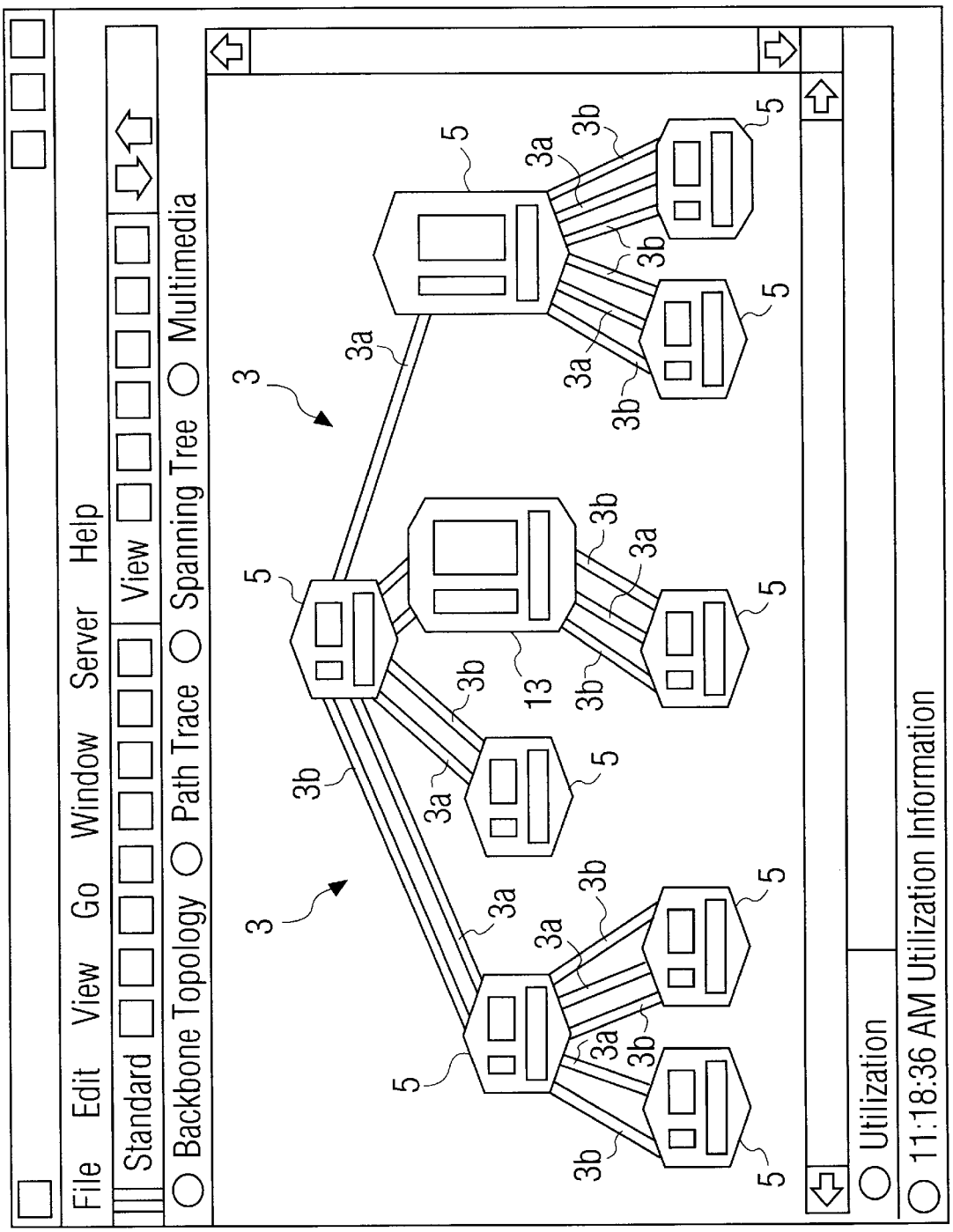
FIG. 4 is a spanning tree view of the network.
Figure 5:
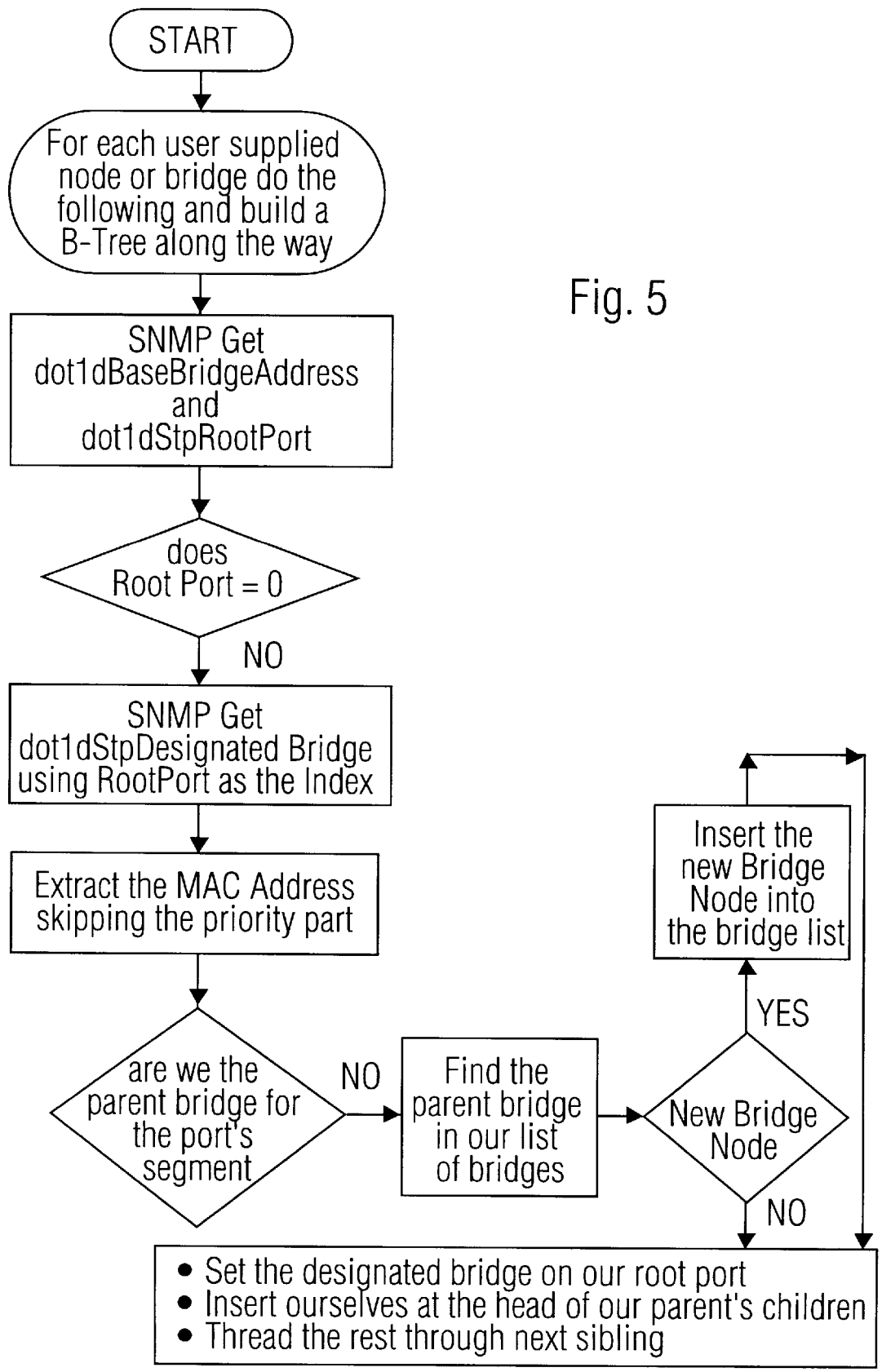
FIG. 5 is a flow chart showing how the information is collected, calculated and displayed for the spanning tree view.

FIG. 4 shows a spanning tree view of a network. Many of the switches 5 have two or more links 3 between themselves. A spanning tree algorithm has been run on these switches 5 and in order to avoid broadcast storms from more than one active link 3 between adjacent switches 5, only one of the links 3 between the adjacent switches 5 is active, and the remaining links 3 are inactive. In the spanning tree view shown in FIG. 4, the active links 3a are shown as solid lines, and the inactive links 3b are shown in outline. This gives the network supervisor an indication as to the vulnerability of a particular link, since if there are several inactive redundant links 3b, reliability of that particular link is particularly strong. If a particular link between two adjacent switches only has one active link, with no inactive links, that link is particularly vulnerable to failure and preventing communication between workstations 1 on opposite sides of that link. Also, the network supervisor is able to see if the spanning tree algorithm has properly activated and deactivated certain links. If the network supervisor sees that there are two active links between adjacent switches 5, then the supervisor knows there has been failure in the spanning tree algorithm, or that the spanning tree algorithm has not been run. Likewise the network supervisor can detect an error if only inactive links are between the two adjacent switches.

ROUTING CONDUCTIVITY VIEW CREATION

The routing topology is constructed as follows:

If a network has two or more router interfaces with addresses on the network, a backbone network icon will be displayed for the network. A line connecting a router to the network represents the router's interface.

The remaining networks have only one associated interface. If the interface type and speed indicate that it is a WAN link, a WAN network icon is created for this network. The line connecting a router to the network represents the router's WAN interface.

All other networks are assigned to a network cloud. Each router will have at most one network cloud icon connected to it. The cloud icon represents all of the non-backbone and non-WAN networks to which the router is directly connected.

The user is able to give each router, network, and cloud a logical name. The application provides reasonable defaults for all logical names.

Note that his is a single, flat view of the backbone. There are no submaps and/or further drill-down maps. Not all of the complexity and levels of hierarchy are replicated. This topology view represents only the essential Layer 3 elements of the campus backbone in a way that is simple and useful.

From this view, the user can select an object and display/modify its properties such as:

Router: Name, Date last baselined, Integrity check status, RIP (Routing Information Protocol) enabled, OSPF (Open Shortest Path First) enabled Backbone Network: Name, Date last baselined, Integrity check status Network cloud: Name, list of networks, and integrity check status of each network OSPF Area Topology If one or more of the backbone routers are running OSPF, the user is able to view the OSPF area topology. To discover this topology, a Router Watch means polls some MIB objects from the ospflfTable. This Router Watch may also display virtual links between otherwise isolated OSPF areas.

Configuration Polling, Change Detection, and Status Update

The purpose of the topology view is to make it easy for network managers to detect changes in the backbone router configuration and draw attention to faulty configurations. To accomplish this the Router watch means periodically polls each router for key configuration data. The user is able to schedule when the next configuration poll will occur along with the time interval between polls. The user is also able to request a configuration poll on demand or a different polling schedule for route table polling depending on the amount of data.

After a configuration poll is completed, the Router Watch means will compare the received data to the previous data (current baseline plus deltas from all configuration polls since the baseline) and detect any differences. All objects that have changed will then be integrity checked to ensure that all changes are consistent with the configuration and topology of the backbone network. Integrity checking is described below.

The color-coded status of each object in the topology views is determined by the result of configuration polling and subsequent integrity checks. The following colors are preferable:

Blue—Unknown: device not yet polled or not currently reachable from management system.

Green—OK: No changes have occurred since last baseline.

Light Green—OK with changes: Changes have occurred since last baseline, each change passed all integrity checks.

Yellow—Warning: Changes have occurred since last baseline, integrity checks indicate a possible problem.

Red—Error: Changes have occurred since last baseline, integrity checks indicate a sever configuration problem.

Grey—Not applicable: Device is not an IP Router (IP view) or does not have OSPF enabled (OSPF view).

The following data will be polled during each configuration poll. This list may be expanded in a further embodiment as more agent support is available and more integrity checks are added.

The following data affects the status of each router icon:

```
ipForwarding
ipRouteTable
    ipRouteDest
    ipRouteMask
    ipRouteIfIndex
    ipRouteMetric1
    ipRouteNextHop
    ipRouteType
    ipRouteProto
```

The routing protocols currently active on a router/router interface are deduced from the ipRouteProto field of each routing table entry. The following objects are polled depending on the protocol(s) that are in use:

RIP: a variable that indicates the currently configured RIP update time

OSPF: ospfAdminStat possibly other objects from ospf-GeneralGroup

The following data affects the discovery of the backbone topology as well as the status of each router interface, network icon, and network cloud icon:

```
ipAddrTable
    ipAdEntAddr
    ipAdEntNetMask
    ipAdEntIfIndex
    ifOperStatus (for interface identified by ipAdEntIfIndex)
    ifType (for interface identified by ipAdEntIfIndex)
    ifSpeed (for interface identified by ipAdEntIfIndex)
ospfIfTable
    ospfIpAddress
    ospfAreaID
    ospfAdminState
    ospfIfHelloInterval
    ospfIfRtrDeadIntnerval
    ospfIfPollInterval
    ospfIfAuthKey
```

Baseline Management

Baseline management enables the user to easily detect changes to the Layer 3 configuration of the backbone. The following commands are available:

Establish—Makes the current configuration data (previous baseline plus deltas) the new baseline. User has the option to keep current warning and error status values or to acknowledge all errors, thereby making the status of all objects in the topology views OK (green) again. User also has the option to save this baseline.

Restore—Makes a previously saved baseline the current baseline and initiates a configuration poll to detect he changes that have occurred since this baseline.

Backup—Enables the user to select one or more previously saved baselines and backup these baselines to a specified location.

Delete—Allows the user to select and delete one or more previously saved baselines.

The Router Watch means can also provide a way to automatically establish a new baseline periodically, e.g. every week.

Integrity Checking

The initial baseline and all subsequent deltas (changes) are integrity-checked. The results of the integrity checks determine the status of the objects within the topology views.

The following integrity checks are preferably provided.
General IP Integrity Checks
IpForwarding No Longer Enabled On a Router: This check detects when a router's IP forwarding state goes from enabled to disabled.
IfOperStatus No Longer Up On a Router Interface: This check detects when a router interface status goes from up to down or testing.
Duplicate IP Address on Router Interface: Each IP address assigned to a router interface (ipAdEntAdr) is checked for uniqueness against all other addresses assigned to router interfaces.
Bad Address/Mask on Router Interface: The network mask on an interface (ipAdEntNetMask) restricts the network or subnet to which routing updates are broadcast or received. While net masks in theory can be anything, they are in practice usually required to be contiguous (i.e. all ones from the left). For example, the mask 255.7.0.0, when converted to binary, equates to 1111 1111 0000 0111 0000 0000 0000 0000 and thus violates this convention.
Network mask Creates Host ID of Zero or All Ones on Router Interface: Under most circumstances, the address and mask on a router interface should not create a host id of 0 or all 1's. For example, the IP address 158.131.67.17 with mask 255.255.255.240 describes an interface with a host id 1 on subnet 158.131.67.16. The IP address 158.131.67.16 with a mask of 255.255.255.240 breaks this convention, since it results in a host id of 0.
Static Route Next Hop is a Non-existent or Shutdown Interface: Entries in the routing table with an ipRouteProto value of "local" or "netmgmt" ar static routes. If the interface associated with the next hop address does not exist or is not up, this check will fail.
Static Route Next Hop is Indirectly Connected: This check verifies the next hop of a static route is either a local interface or a directly connected interface.
IP RIP Specific Integrity Checks
RIP Update Timer Inconsistent: This check verifies that RIP's update interval is configured consistently on all routers running RIP.
IP OSPF Specific Integrity Checks
OSPF No Longer Enabled on a Router: This check detects when a router's OSPF admin stat goes from enabled to disabled.
Addresses of an Interface in Different OSPF Areas: All addresses on an interface must map to the same area.
OSPF Area Does Not Border Area Zero: An OSPF network should be designed such that all areas border area zero. If an area's connection to the backbone is lost, the area can be repaired by establishing a virtual link. This check can be made into a warning or make it a warning).
OSPF Interface Parameters Inconsistent: All OSPF interfaces attached to a common network must be configured consistently for OSPF to properly form adjacencies. This check verifies that the OSPF interface timer intervals and authentication parameters are consistent.

Reporting

The Router Watch means allows the user to generate HTML (Hyper Text Markup Language) reports to summarize the changes that have occurred over time. Integrity check failures can be highlighted within each report. Router Watch provides the following types of reports:

Baseline report with changes includes the baseline along with the history of all changes detected by Router Watch since the baseline.

Change-only report—includes all changes detected by Router Watch since the baseline.

Problem report—includes only those changes that failed an integrity check

Per-router changes that can be identified in the reports include the following:
Change to general router configuration
New route destination in route table
Modified route
Delete route destination
Per-network/area changes that can be identified in the reports include the following:
New interface in network Modified interface configuration Interface removed from network

Troubleshooting Tools

Bad Route Tracking Wizard

This tool enables the network manager to trace a bad route within a routing table from any starting router back to the source of the route. The user must first select a router and enter the destination IP address of the bad route. The tool first retrieves the ipRouteTable entry with the ipRouteDest matching the bad destination from the starting router. If the route type is not "direct", the tool will use the next hop IP address as the address of the next router to contact. The list of router next-hop interfaces is displayed to the user while the search is in progress. This process continues until a direct route is found.

When the source of the route is located, the user is asked to select one of the following actions:

invalidate the bad route set the router interface to "down"

launch Telnet do nothing

Multiple Router Configuration

A topology view is a natural point to integrate bulk configuration tools, since the topology identifies the groups of objects that require consistent configuration. Examples of groups include all router interfaces that share a common network (identified by a network icon within the IP topology), all router interfaces that share a common OSPF Area (identified by an area icon within the OSPF topology), and all routers running a specific routing protocol. Using these groups, the Router Watch means will provide bulk configuration tools that enable the user to correct the configuration problems detected by the integrity checks. Some tools are as follows:

IpForwarding enabled on all IP routers

Network mask configured consistently on all interfaces within a network

UDP Helper configured consistently on all routers

RIP Update timer for routers running RIP

OSPF General variables configured consistently on all routers in OSPF area

OSPF hello interval, dead interval, and authentication attributes for all interfaces within an OSPF area.

Figure 9:
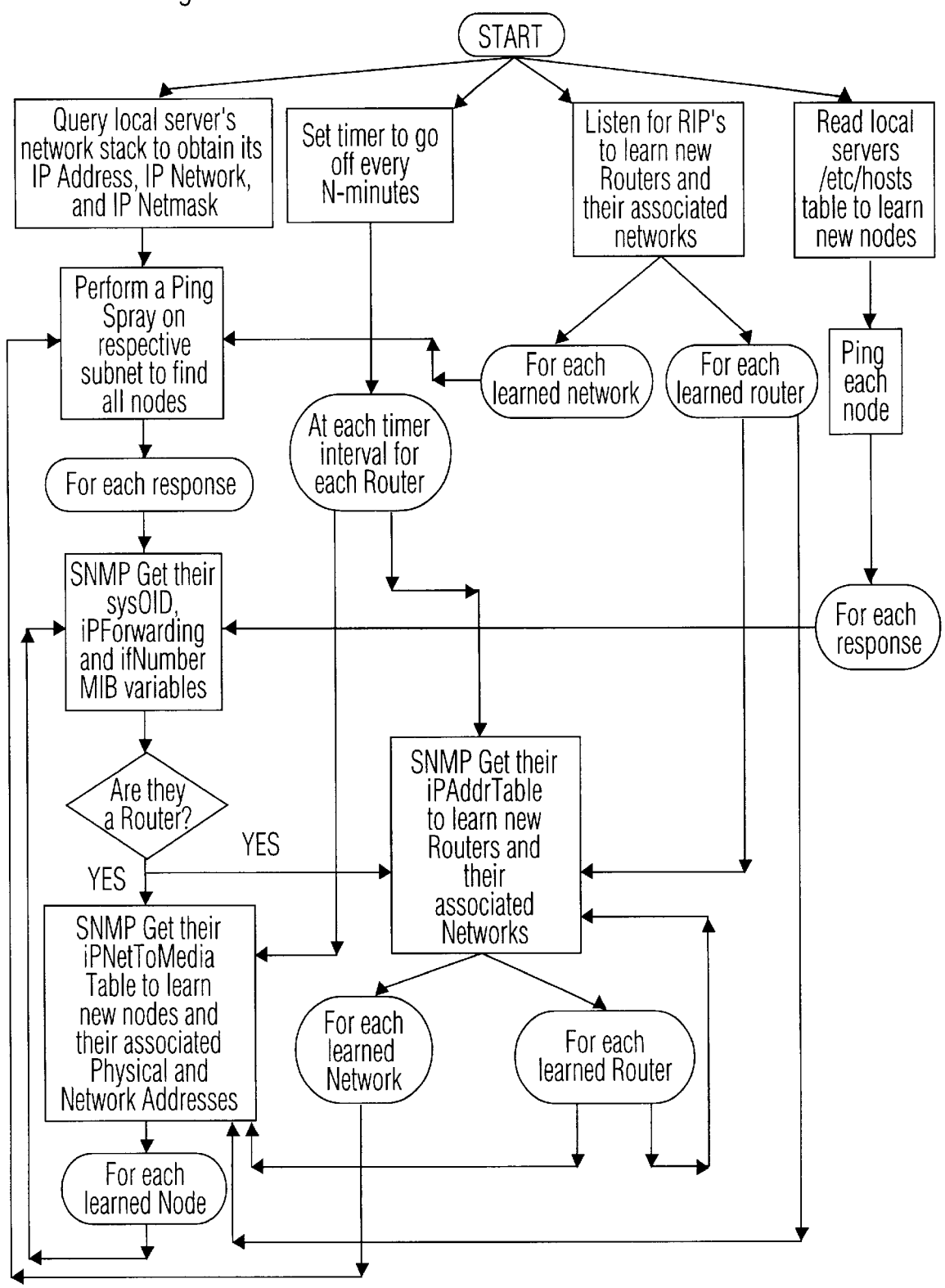
FIG. 9 is a flow chart showing how information is collected, calculated and displayed for the routing view.
Figure 10:
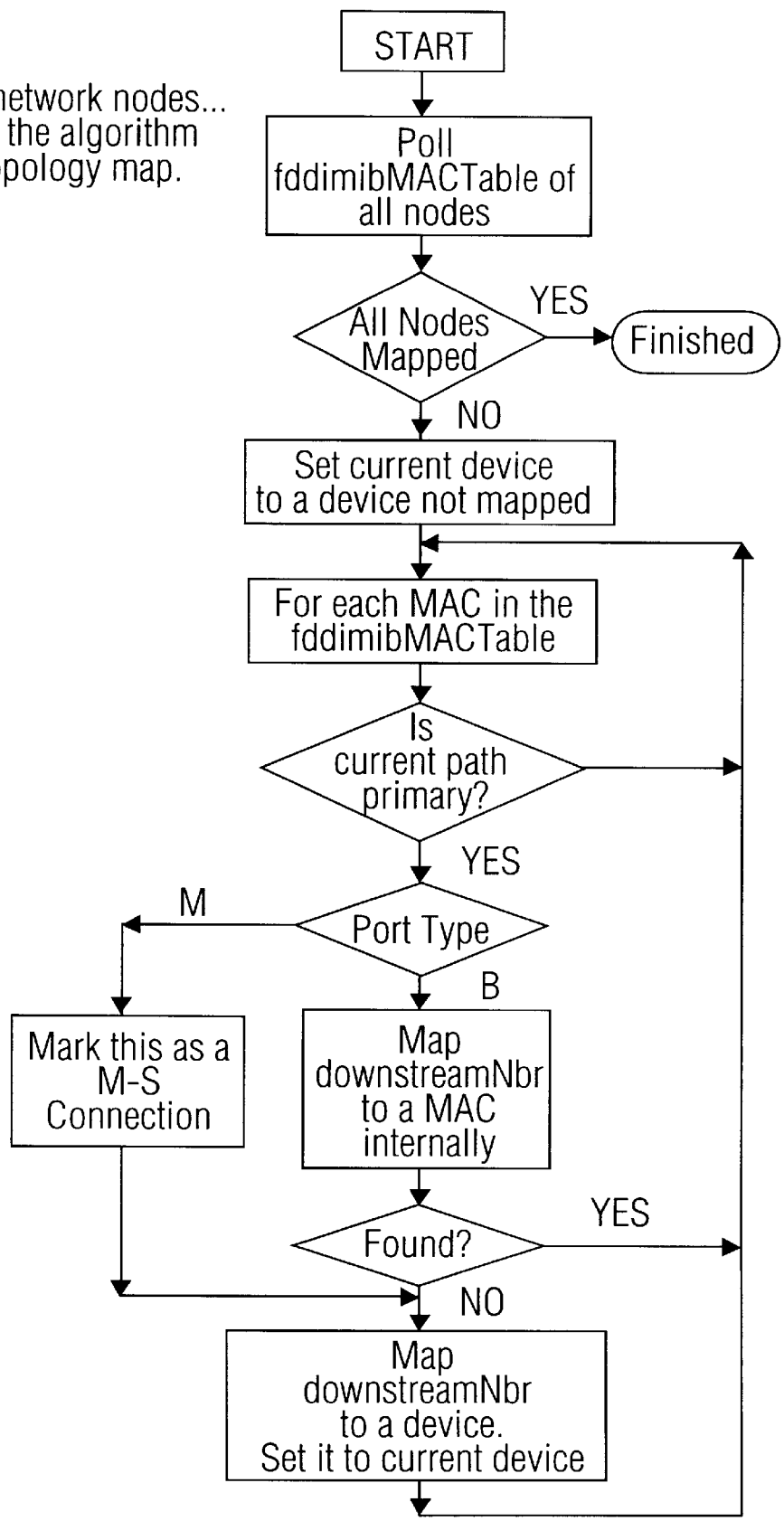
FIG. 10 is a flow chart showing how information is collected, calculated and displayed for the ring portion of the routing view.
Figure 11:
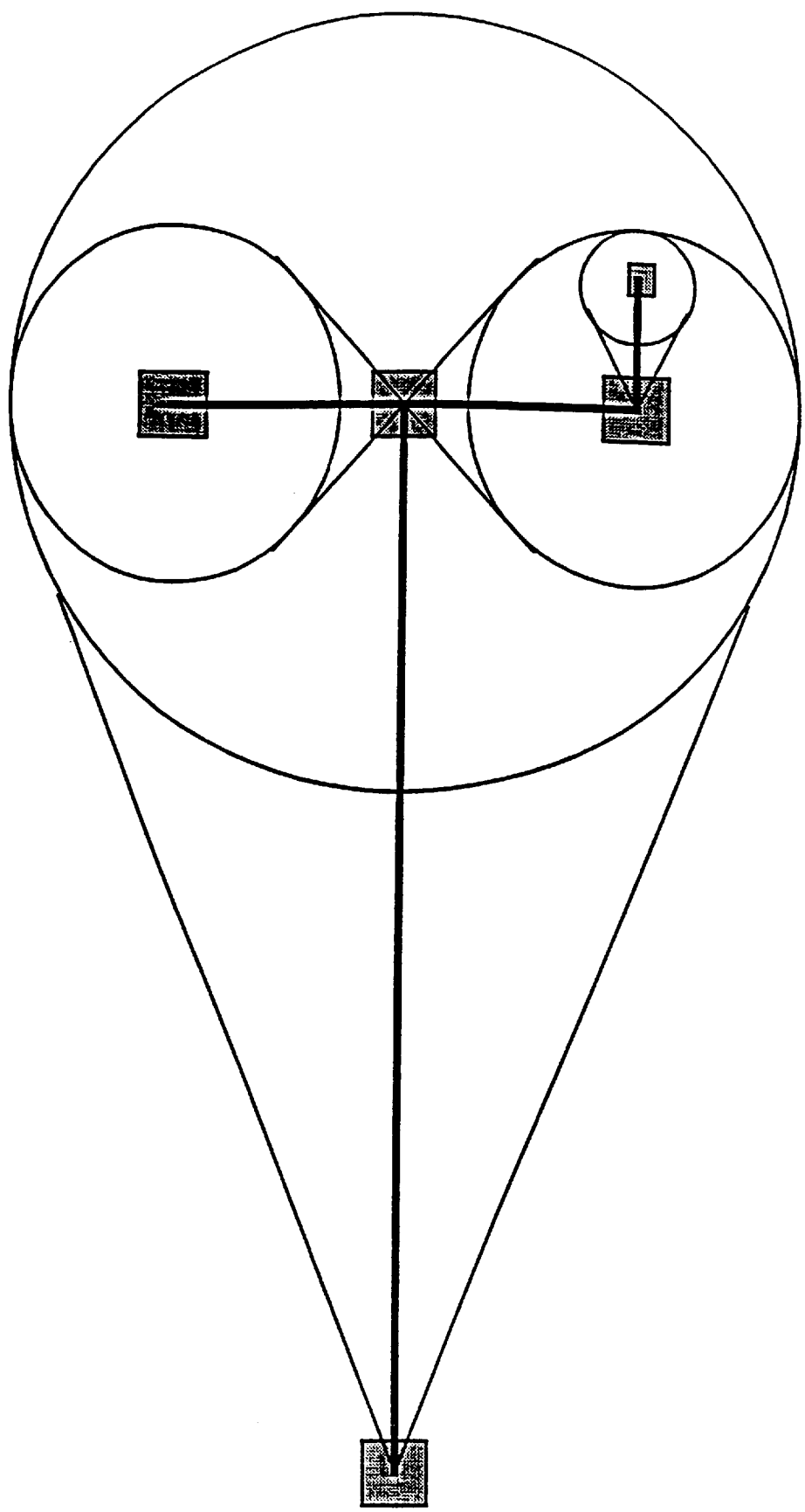
FIG. 11 is a diagram illustrated in the geometrical relationship between each node in the algorithm (the nodes are represented by squares)
Figure 12:
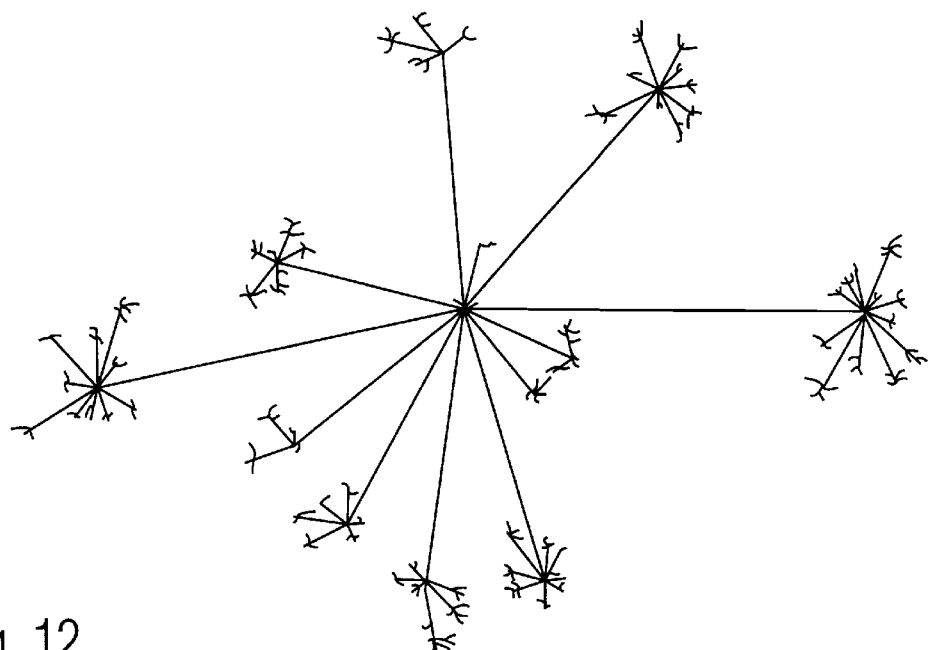
FIG. 12 is a map consisting of 6032 objects "nodes and connections" as placed by the radial place algorithm.
Figure 13:
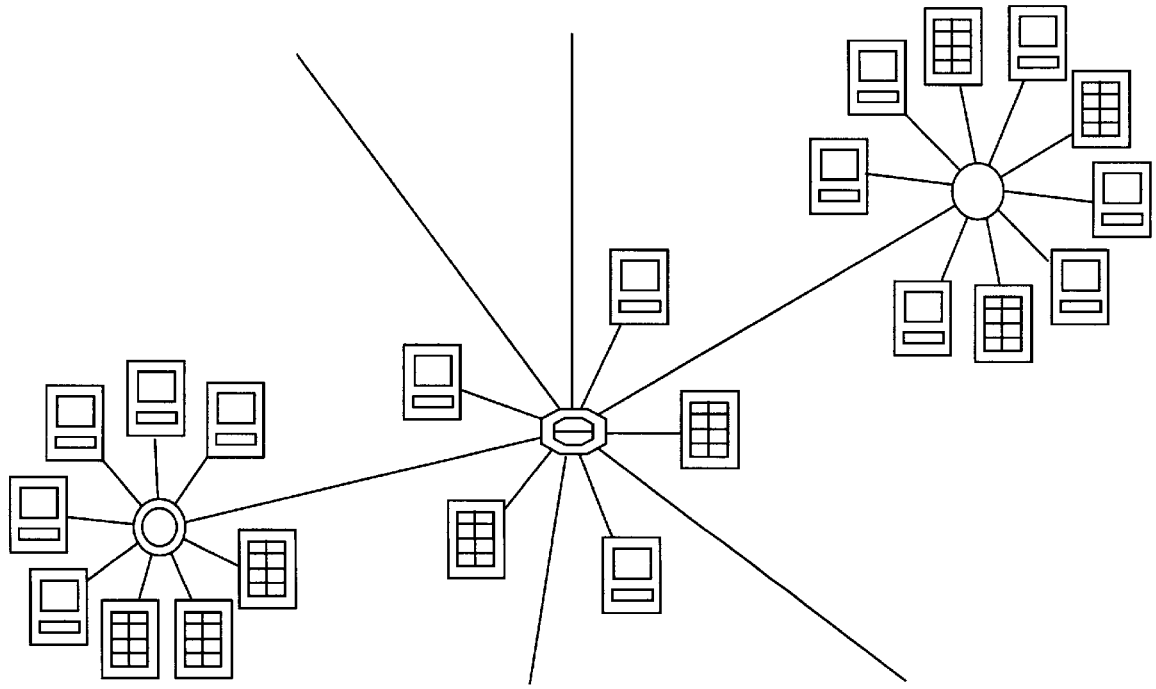
FIG. 13 is a detailed view of a section of FIG. 21.
Figure 14:
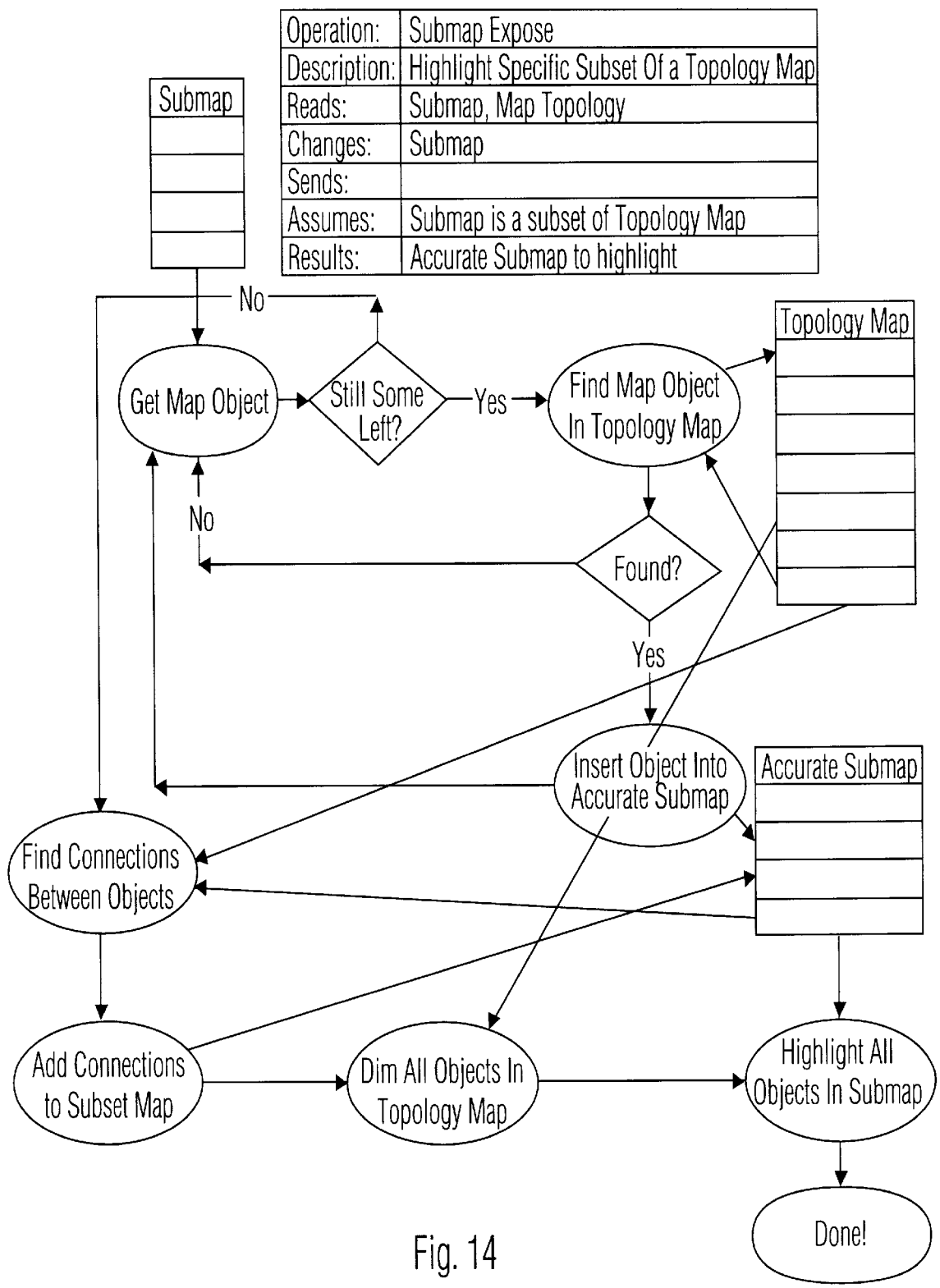
FIG. 14 is a flow chart showing how the radial placement is determined in a view.

OSPF virtual link configuration, all interfaces along the link must be consistent The routing view uses a discovery algorithm to determine the information for the routing view as shown in FIG. 9.

The "Start" state signifies the beginning or start of the algorithm. There are four states that are transitioned to from the start state. They are "Query local server's network stach to obtain its IP Address, IP Network and IP Netmask", "Set timer to go off every N-minutes", "Listen for RIPs to learn new Routers and their associated networks" and "Read local servers \etc\hosts table to learn new nodes".

Query local servers network stack to obtain its IP Address, IP Network and IP Netmask In this state the local server's network stack is quered to obtain its IP Addressm IP Network and IP Netmask. The "Perform a Ping Spray on respective subnet to find all nodes" state is then transitioned to.

Set timer to go off every N-minutes

In this state a timer is set to go off every N minutes. Thereafter, the "SNMP Get their ipNetToMedia Table to learn new nodes and their associated Physical and Network Addresses" state and the "SNMP Get their ipAddrTable to learn new Routers and their associated Networks" state are transitioned to once for each router at each timer time interval.

Listen for RIPs to learn new Routers and their associated networks

In this state RIPs are registered for and thereafter each time a RIP arrives the "Perform a Ping Spray on respective subnet to find all nodes" state is transitioned to for each network that was learned from the RIP and the "SNMP Get their ipNetToMedia Table to learn new nodes and their associated Physical and Network Addresses" state and the "SNMP Get their ipAddrTable to learn new Routers and their associated Networks" state is transitioned to for each router that was learned from the RIP.

Read local servers \etc\hosts table to learn new nodes

In this state the server's \etc\hosts table is read to learn all nodes that are registered in the table. For each learned node the "Ping each node" state is transitioned to.

Performed a Ping Spray on respective subnet to find all nodes

In this state a ping spray is performed on the respective subnet to find all nodes. For each response or pong the "SNMP Get their sysOID, ifForwarding and ifNumber MIB variables" state is transitioned to.

Ping each Node

In this state each given node is pinged. For each response or pong, the "SNMP Get their sysOID, ipForwarding and ifNumber MIB Variables" state is transitioned to.

Perform a Ping Spray on respective subnet to find all nodes

In this state a ping spray is performed on each respective subnet to find all nodes on each respective subnet. For each response the "SNMP get their sysOID, ipForwarding and ifNumber MIB variables" state is transitioned to.

SNMP Get their sysOID, ipForwarding and ifNumber MIB variables

In this state the respective nodes sysOID, ipForwarding and ifNumber MIB variables are gotten with an SNMP get. If they are a router both the "SNMP Get their ipNetToMediaTable to learn new nodes and their associated Physical and Network Addresses" and "SNMP Get their ipAddrTable to learn new Routers and their associated Networks" states are transitioned to.

SNMP Get their ipNetToMediaTable to learn new nodes and their associated Physical and Network Addresses In this state the respective nodes ipNetToMediaTable is gotten using a series of SNMP getnexts. For each learned nodes in the ipNetToMediaTable the "SNMP Get their sysOID, ipForwarding and ifNumber MIB variables" state is transitioned to.

SNMP Get their ipAddrTable to learn new Routers and their associated Networks

In this state the respective nodes ipAddrTable is gotten using a series of SNMP getnexts. For each learned Network the "Perform a Ping Spray on respective subnet to find all nodes" state is transitioned to. For each learned Router in the ipAddrTable the "SNMP Get their ipAddrTable to learn new Routers and their associated Networks" state and the "SNMP Get their ipNetToMediaTable to learn new nodes and their associated Physical and Network Addresses" state is transitioned to.

MULITMEDIA VIEW

To provide the multimedia view, two different tools, TRACE, MRTREE and IGNPSNOOP are used to create a path or set of paths and allow the grouping of interfaces. The interface group can then be used to gather interface diagnostic that are used to create historical trends.

The MTRACE tool creates a path, tracing the flow of Multicast IP traffic, from a known source, to a given end station. Along the path it collects certain interesting diagnostics, from which a system manager is able to determine the overall status of the data flow.

The path is discovered using IGMP_TRACE messages. No SNMP support, other than MIB (Management Information Base) II is required for this tool. An example application which at least performs the same tracing is mtrace. The mtrace program is provided as part of the mrouted distribution. It is leveraged as a working example of how to solve the IP Multicast trace.

A Second Tool, Multicast Routing Tree is able to trace the forest multicast routing trees. It is able to find both actual and potential multicast trees. Potential trees are pruned, whereas actual trees are involved in routing multicast traffic.

The actual trees can be discovered using the DVMRP and IP-Multicast MIBS. Roughly one dozen mib objects need be supported in the MIBS. Both mibs are IETF drafs.

The third and final tool will map the extent of IP Multicast traffic within the layer two network. Given a spanning tree for a switched network, and IGMP group information, it is possible to show the layer 2 IP Multicast topology, drawing attention to the prunes performed via IGMP snooping. In non-spanning tree environments, information at the node level can be displayed as a table.

The layer 2 topology can be discovered if the node supports the IGMP MIB. This is a small MIB that contains a table with group membership for each ifIndex.

The result is that paths and trees become managed entities. The paths/trees are set as permanent or transient. Permanent paths/trees can be polled at a user described frequency. Diagnostic information will be collected from the entity and stored to the status watch database. Transient paths are on-demand paths/trees which the network manager wishes to "ping" test. For transients, statistics/diagnostics are gathered as long as the network client monitors the tree/path.

MTRACE

Assessing problems in the distribution of IP multicast traffic can be difficult. Mtrace utilizes a tracing feature implemented in multicast routers (mrouted version 3.3 and later) that is accessed via an extension to the IGMP protocol. A trace query is passed hop-by-hop along the reverse path from the receiver to the source, collecting hop addresses, packet counts, and routing error conditions along the path, and then the response is returned to the requestor. The only required parameter is the source host name or address. The default receiver is the host running mtrace, and the default group is "MBone Audio" (224.2.0.1), which is sufficient if packet loss statistics for a particular multicast group are not needed. These two optional parameters may be specified to test the path to some other receiver in a particular group, subject to some constraints as detailed below. The two parameters can be distinguished because the receiver is a unicast address and the group is a multicast address.

Operation

The technique used by the traceroute tool to trace unicast network paths will not work for IP multicast because ICMP responses are specifically forbidden for multicast traffic. Instead, a tracing feature has been built into the multicast routers. This technique has the advantage that additional information about packet rates and losses can be accumulated while the number of packets sent is minimized. Since multicast uses reverse path forwarding, the trace is run backwards from the receiver to the source. A trace query packet is sent to the last hop multicast router (the leaf router for the desired receiver address). The last hop router builds a trace response packet, fills in a report for its hop, and forwards the trace packet using unicast to the router it believes is the previous hop for packets originating from the specified source. Each router along the path adds its report and forwards the packet. When the trace response packet reaches the first hop router (the router that is directly connected to the source's net), that router sends the completed response to the response destination address specified in the trace query.

If some multicast router along the path does not implement the multicast traceroute feature or if there is some outage, then no response will be returned. To solve this problem, the trace query includes a maximum hop count field to limit the number of hops traced before the response is returned. That allows a partial path to be traced.

The reports inserted by each router contain not only the address of the hop, but also the ttl required to forward and some flags to indicate routing errors, plus counts of the total number of packets on the incoming and outgoing interfaces and those forwarded for the specified group. Taking differences in these counts for two traces separated in time and comparing the output packet counts from one hop with the input packet counts of the next hop allows the calculation of packet rate and packet loss statistics for each hop to isolate congestion problems.

Finding the Last-Hop Router

The trace query must be sent to the multicast router which is the last hop on the path from the source to the receiver. If the receiver is on the local subnet (as determined using the subnet mask), then the default method is to multicast the trace query to all-routers.mcast.net (224.0.0.2) with a ttl of 1. Otherwise, the trace query is multicast to the group address since if the receiver is a member of that group then the last hop router will also be a member of that group. Therefore it is necessary to specify a group that the intended receiver has joined. This multicast is sent with a default ttl of 64, which may not be sufficient for all cases. If the last hop router is known, it may also be addressed directly.

When tracing from a multihomed host or router, the default receiver address may not be the desired interface for the path from the source. In that case, the desired interface should be specified explicitly as the receiver.

Directing the Response

By default, mtrace first attempts to trace the full reverse path, unless the number of hops to trace is explicitly set. If there is no response within a 3 second timeout interval, switches that are probed are switched to hop-by-hop mode. Trace queries are issued starting with a maximum hop count of one and increasing by one until the full path is traced or no response is received. At each hop, multiple probes are sent. The first half of the attempts (default is one) are made with the unicast address of the host running mtrace as the destination for the response. Since the unicast route may be blocked, the remainder of attempts request that the response be multicast to mtrace.mcast.net (224.0.1.32) with the ttl set to 32. This is more than what's needed to pass the thresholds seen so far along the path to the receiver. For the last quarter of the attempts (default is one), the ttl is increased by another 32 each time up to a maximum of 192. Alternatively the initial unicast attempts can be forced to use multicast instead. After the specified number of attempts have failed, mtrace will try to query the next hop router with a DVMRP_ASK_NEIGHBORS2 request (as used by the mrinfo program) to see what kind of router it is.

Agent Requirements

This tool will require the agent support the IGMP Trace query extension (rev. post mrouted 3.3).

MRTREE

Operation mrtree is a utility for gathering information about a multicast tree rooted at a given router. In the process of discovering a tree, it gathers information about the capabilities of the constituent routers as well as packet count statistics.

mrtree can be used to discover:

the actual multicast (sub)tree for a given source multicasting to a given group and rooted at a given router.

the potential multicast (sub)tree for a given source rooted at a given router.

An actual tree consists of routers which are actually currently forwarding multicast traffic sent by a given source to a specific multicast group.

A potential tree consists of routers which would be traversed if every host reachable by them were a member of a group to which the given source was multicasting.

Mrtree uses a combination of IGMP and SNMP queries to discover a multicast tree and hence its success depends very much on the level of SNMP support provided by the routers comprising the tree. The mrtree output provides the most information for trees whose routers support SNMP queries to the DVMRP and IP Multicast MIBs. Information contained in the IP Multicast MIB is used when discovering an actual tree whereas information contained in the DVMRP MIB is used when discovering a potential tree. However, even if some routers in a multicast tree do not support these MIBs, mrtree still provides important information and makes a best effort at discovering as much of the tree as possible. In certain cases, mrtree will even jump across a non-SNMP-aware router whose parent and children are SNMP-aware.

Agent Requirements

Mrtree uses the IPMulticast MIB and the DVMRP MIB to map actual trees and to gather packet statistics.

The potential tree can be discovered if the agent supports the DVMRP ASK NEIGHBOR message.

To Discover the actual tree—the tree over which data is being forwarded, roughly 15 MIB attributes of the DVMRP MIB and the IP Multicast MIB are required. The actual MIB objects are included in the MIB section of this document.

IGMPSNOOP

Switched networks limit excessive IP Multicast traffic by using IGMP Snooping. Switches listen promiscuously for IGMP messages and only forward IP Multicast traffic on to ports where IGMP messages have been seen. IGMPSnoop will enumerate which switched ports in a layer 2 network are forwarding IGMP traffic. Given a layer 2 spanning tree and the forwarding inventory, IGMPSnoop will be able to identify the subtree over which IP Multicast traffic is forwarded.

Operation

The IGMP MIB contains two tables:

1. the IGMP Interface Table which contains one row for each interface on which IGMP is enabled, and
2. the IGMP Cache Table which contains one row for each IP multicast group for which there are members on a particular interface.

The MIB is an experimental IEFT draft. The MIB can be used as a basis for implementing the necessary MIB support for the application.

The tool iterates through the Interface Table identifying on which interfaces IGMP is enabled. The table must also indicate on which interfaces IP Multicast traffic is dropped due to snooping. If the interface is enabled, then the Cache table can be queried to identify which Multicast groups are forwarded across an interface.

Given a set of interfaces S which are part of a spanning tree, and a set of interfaces M which are forwarding IP Multicast traffic, then the intersection of those two sets will identify the Layer 2 subtree over which IP Multicast traffic is forwarded. The set M can be constrained by group, allowing the application to form a forest of Layer 2 trees over which multicast traffic is forwarded.

Agent Requirements

The agent needs to support most of the IGMP MIB objects. In addition to this MIB, the IGMP Interface table should include a column indicating whether or not the interface is disabled due to snooping.

Diagnostics and Reporting

As the set of interfaces over which IP multicast traffic flows is discovered, they are polled for diagnostic information at a period set by the network manager. Paths/Trees marked as permanent, are polled, information about the interfaces is stored in the statuswatch database. This builds up historic content for the path/Tree. Displays of the historic information can be of a node graph, allowing drill-down on the link or on the router interface. Tabular reports are also possible. The information gathered will match up to the IP Watch tool, allowing a sharing of code, and allowing the user to be familiarized with the type of information which is useful. A short list of MIB attributes is as follows:

mtu mismatch.

high receive utilization.

high transmit utilization.

high output queue length.

high percent of receive packets being discarded high percent of packets received with an unknown or unsupported protocol type.

high percent of packets received with errors.

high percent of outbound packets discarded.

high percent of outbound packets with errors.

The following conditions are be periodically tested for each routing module along the paths:

ipForwarding disabled along the path.

large percent of IP transmit packets being discarded.

large percent of IP transmit packets being discarded because no route could be found for them.

high percent of IP transmit packets being discarded because they needed to be fragmented but couldn't.

high percent of IP packet reassembly failures.
high percent of IP packets needing to be reassembled.
high percent of IP receive packets with address errors.
high percent of IP receive packets with header errors.
high percent of IP receive packets discarded because of unknown or unsupported protocols.
high percent of IP receive packets discarded.
high percent of IP management overhead.
high percent (compared to number of packets transmitted) of destination unreachable messages received.
high percent (compared to number of packets transmitted) of time exceeded messages received.
high percent (compared to number of packets transmitted) of parameter problem messages received.
high percent (compared to number of packets transmitted) of source quench messages received.
high percent (compared to number of packets transmitted) of redirects received.
high percent (compared to number of packets received) of destination unreachable messages transmitted.
high percent (compared to number of packets received) of time exceeded messages transmitted.
high percent (compared to number of packets received) of parameter problem messages transmitted.
high percent (compared to number of packets received) of source quench messages transmitted.
high percent (compared to number of packets received) of redirects transmitted.
high percent of ICMP messages being received with errors.
high percent of ICMP messages that were not transmitted due to problems within ICMP, such as lack of buffers.

MIB Requirements

Potential paths can be formed using the DVMRP ASK NEIGHBORS message. Actual trees can not be formed without additional MIB support. The public domain MRTREE application identifies the following MIB objects as essential to fully mapping a multicast tree:

```
#define ipAdEntIfIndex               ".1.3.6.1.2.1.4.20.1.2"
#define dvmrpVersion                 ".1.3.6.1.3.62.1.1.1.0"
#define dvmrpVInterfaceLocalAddress  ".1.3.6.1.3.62.1.1.3.1.4"
#define                              ".1.3.6.1.3.62.1.1.3.1.5"
dvmrpVInterfaceRemoteAddress
#define                              ".1.3.6.1.3.62.1.1.3.1.6"
dvmrpVInterfaceRemoteSubnetMask
#define dvmrpNeighborVersion         ".1.3.6.1.3.62.1.1.4.1.5"
#define dvmrpRouteUpstreamNeighbor   ".1.3.6.1.3.62.1.1.5.1.3"
#define dvmrpRouteNextHopType        ".1.3.6.1.3.62.1.1.6.1.4"
#define ipMRouteEnable               ".1.3.6.1.4.1.9.10.2.1.1.1.0"
#define ipMRouteUpstreamNeighbor     ".1.3.6.1.4.1.9.10.2.1.1.2.1.4"
#define ipMRoutePkts                 ".1.3.6.1.4.1.9.10.2.1.1.2.1.8"
#define ipMRouteOctets               ".1.3.6.1.4.1.9.10.2.1.1.2.1.10"
#define ipMRouteNextHopState         ".1.3.6.1.4.1.9.10.2.1.1.3.1.6"
```

Note that these MIB objects also map the number of IP-Multicast packets through an interface.

SPANNING TREE VIEW

The present invention contains a tool for mapping a spanning tree.
The tool's features are:
Create a layer 2 spanning tree graphic showing
which switches are participating in the spanning tree
which bridges within the switch are participating in the spanning tree
the designated port of each participating bridge Layer 2 troubleshooting information (not limited to):
Identify broadcast storms across STP links
Utilization
FCS Errors
Excessive STP reconfigurations
Other StatusView Layer 2 diagnostic capability
STP Configuration troubleshooting including
High Speed Port having greater STP cost than low speed port
Trunk port in blocked state (non-root and non-designated)
Extended Mapping
Identify port based (802-1q) VLAN
Identify hybrid and trunk links (802.1q)
Identify Trunking ports (BA/Lanplex)
Identify 802.1D and VLAN Aware Bridges (802.1q)
Ideally, the tool extends status view. It is able to construct a set of ports P, based on its topology mappings. The set P can then be queried by status view type probing, reusing much of the learned logic, and reporting code. The spanning tree tool brings focus to the set of switched ports which status view currently monitors.
Operation
Nodes are discovered using Platform Helper, Bridges contained within the nodes are subsequently discovered by SNMP polling. The user should be allowed to group nodes based on:
IP Subnet(s)
Database Inventory
HPOV map
Grouping mitigates the problem of building all spanning trees for the entire network, as you would if the entire Platform Helper node database was used.
Agent Requirements
To build the standard spanning tree, no additional MIB support is required. To build the Extended tree (VLANs etc) additional MIB support is required. MIB support for discovering trunked ports is required and addressed by.
Algorithm
Three OIDs from RFC 1493—Bridge MIB—July 1993 are used to map the tree, they are:
dot1dBaseBridgeAddress—The MAC address used by this bridge when it must be referred to in a unique fashion. It is preferred that this be the numerically smallest MAC address of all ports that belong to this bridge. However it is only required to be unique. When concatenated with dot1dStpPriority a unique BridgeIdentifier is formed which is used in the Spanning Tree Protocol.
dot1dBaseBridgeAddress—The MAC address used by this bridge when it must be referred to in a unique fashion. It is recommended that this be the numerically smallest MAC address of all ports that belong to this bridge. However it is only required to be unique. When concatenated with dot1dStpPriority a unique Bridge Identifier is formed which is used in the Spanning Tree Protocol.
dot1dStpRootPort—The port number of the port which offers the lowest cost path from this bridge to the root bridge.
dot1dStpPortDesignatedBridge—The Bridge Identifier of the bridge which this port considers to be the Designated Bridge for this port's segment.
The algorithm determines the local bridge id, the root port, and its parent bridge id. Knowing these values allow the bridge to form parent child relationships, which builds the spanning tree topology map.
Layer-2 Diagnostics
Status Watch collects most MIB-II data that can be collected. It also does a performance utilization at the port level. The spanning tree tool should apply the same diagnostics against the set of ports P, which make up the spanning tree. It is preferable that status watch itself should be utilized, or possibly launched on a drill down operation.

Spanning Tree Diagnostics

Spanning tree diagnostics are more focused on the health of the tree. This is very different from Status Watch diagnostics. The following tree attributes are monitored:
Excessive reconfiguration of the spanning tree root.

Could possibly indicate port problems determine which 2 (or set) of bridges are fighting to become root.

Trunking Ports in STP blocking state

Good choice for a root node a BA switch is generally a better choice for a root bridge than a LinkSwitch 2200 since it is more likely to handle the downstream traffic.

Identify choke points

Consider the spanning tree which has all paths configured as 100 Tx ports, except for the paths to the root bridge which is a 10 MB path. Data crossing the root bridge is now limited to 10 MB, even though most of the paths through the tree are 100 Tx.

All these conditions are easily discovered with MIBII information (except Trunking).

TRUNKING VIEW

Trunking, also called "Load Sharing", is a technique of aggregating multiple network links as one high-speed pipe among different network nodes. Trunking is a very important feature as it adds bandwidth capacity among switches. It also provides fault-tolerance from the loss of one or more trunk links.

The main features trunking management provides are:
1. Configuration Management
Graphical representation of trunk groups. It allows the users to see what trunk groups have been defined, what links are part of a trunk, what state(up/down) the trunk is in, and what state each individual link is in.
Show which MAC addresses are using which particular links or launch MACWATCH
Easy trunking setup. Just select a number of ports, give a name, then warm reboot.
Performance Management
Display the utilization, error rates of the trunk groups, and each individual link in the trunk group
Fault Management
Automatic detection of some misconfigurations.

Trunk View

Trunking view is a graphical representation of the trunk groups.
Configuration Possibilities
Point to Point
One system to another system with no interim devices.

| 158.101.122.30 | 158.101.121.23 |
| --- | --- |

Solid line indicates the link is up. Dashed line indicates the link is down
Each link is differently color-coded
The map of ports are displayed if the information is available in the MIB. (For each port, it is known which MACs are connected)

Figure 7:
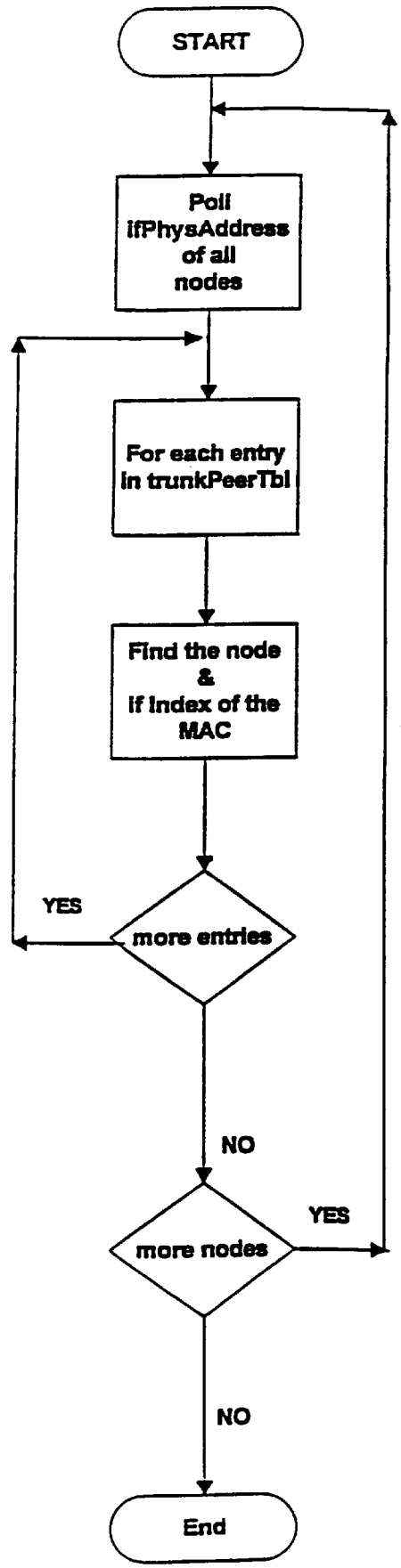
FIG. 7 is a flow chart showing how the information is collected, calculated and displayed for the trunking view.

As shown in FIG. 7, the trunking mapping algorithm begins by polling the ifPhysical Address of all the nodes. Each entry is placed in a trunkpeer table and the node and IF index of the MAC is determined. This repeats for all entries in the trunkpeer table. Once all of the entries in a particular table have been completed, a check is performed to determine if there are any additional nodes. If an additional node is found, the entire operation is started again from the beginning, including the processing of each entry in the trunkpeer table. This is then repeated for all the nodes. Once all the nodes have been completed, the algorithm is finished.

RING PROTOCOL VIEW

The present invention preferably may be used to describe FDDI rings and detail an algorithm to do FDDI topology mapping. The present invention maps the FDDI ring, the cascaded trees in the case of FDDI concentrators, and the internal FDDI MAC interconnection using standard FDDI mib as much as possible.

MIB variables needed

1. IfInterfaceTable to do MAC to ifIndex mapping: ifIndex, ifPhysAddress,ifType
2. fddimibMACTable to do the topology mapping: fddimibMACIfIndex, fddimibMACCurrentPath, fddimibMACUpstreamNbr, fddimibMACDownstreamNbr, fddimibMACDownstreamPORTType Algorithm All devices in the map have already discovered either through platform discovery or entered by the users. Preferably all devices given must constitute the superset of the devices in the FDDI topology mapping.

The following details the steps to do the primary ring mapping, the same could be done for secondary and local path.

Given (1) a device on the ring
  (2) a superset of all the devices on the final map
Find the FDDI ring with the trees containing the device.
1. Poll the ifInterfaceTable of all the devices and store the ifIndex ,ifPhysAddress only if the ifType is FDDI
2. Start from the given device, do the following:
  a. For a given device, poll the fddimibMACTable. For each MAC in the fddimibMACTable, if fddimibMAC-CurrentPath is primary then look at its fddimibMAC-DownstreamPORTType.
  b. If the fddimibMACDownstreamPORTType is B, first try to map the fddimibMACDownstreamNbr to an internal MAC. If it is an internal MAC, map it to a (slot,port)
  c. If the fddimibMACDownstreamNbr is not an internal MAC, map fddimibMACDownstreamNbr to a device. This device is the downstream neighbor of the given device. If the downstream is the given device then stop. Otherwise repeat step a,b,c,d for this device.
  d. If the fddimibMACDownstreamPORTType is M then this MAC's downstream neighbor should be an external MAC. This is a tree connection.
  Find the device associated with this fddimibMACDownstreamNbr. Recursively doing step a,b,d for this device, the cascaded tree off this FDDI concentrator should be able to map out.

IP PATH TRACING VIEW

In order to collect information to determine the critical paths from one workstation to another, the present invention uses a tool called the "BA Traceroute tool".

The router operates by sending out a packet to the destination address with a TTL set to 1. The first hop then sends back an ICMP error message indicating the packet could not be delivered because the TTL expired. The packet is then resent with a TTL set to 2. The second hop then sends back an ICMP message indicating the TTL expired. The process continues until the destination address is reached.

The disadvantage of this algorithm is that:

The reverse path is not traced (forward and reverse paths may be asymmetric)

2 n packets are generated for each trace, where n is the number of hops to the destination.

The advantages over other tracing techniques:

Every router implements the ICMP TTL expired response.

No security mechanism required (community string)

RTT can be easily computed along the forward path.

The anticipated use of the traceroute feature is to test for IP connectivity from a CB3500 to an end station or to another switch. The destination address might be anywhere in the Internet.

Permanent Traceroutes

The Backbone view application must use SNMP to control the BA traceroute feature. The traceroute is used to test connectivity between a backbone CB3500, and any destination in the Intranet. Traceroutes can be configured to be permanent or non-permanent.

Permanent traceroutes can be scheduled to run periodically (every 3 minutes for example). Non-permanent traces are useful for on-demand debugging, while permanent traceroutes would make a useful status tool, especially in the case of a remote system whose SNMP community strings are not known.

Traceroute vs. MIB-II route trace

If the read community string is known, a network management agent can use the MIB-II IP group to perform a hop by hop trace of a route. A MIB-II trace has the added benefit of providing additional information, most importantly an IfIndex, from which diagnostics can be gathered.

In an Intranet or in a campus environment, it is very likely that the read community string is known for all the local routers. It is far less likely that the read community string is known outside the local campus. In the case where the community string is not known, then a traceroute is the only connectivity test. Otherwise, a MIB based walk of routes can solve the IP connectivity problem.

It is preferable that the traceroute is limited to a highly granular connectivity test, whereas the MIB-II route walk technique be used to gather comprehensive diagnostic information at the source and at the destination, for forward and reverse paths. It is always possible to gather diagnostic information at the traceroute source interface, the same information proposed for the MIB-II route walk & the DVMRP tools.

Agent Requirements

MIB support is required to return the traceroute information to the management station. The following tables implement the feature:

The agent is triggered to start a traceroute through snmp in two ways:

Row creation in the TraceRouteTable.

When the tracestate object is set by a management station.

NETWORK MAP GRAPHICS ENGINE (NNGE)

Once all of the information for the various views have been collected, determined or calculated, this information is graphically displayed in the form of symbols in connection between the symbols.

The Network Map Graphics Engine (NMGE) is a high performance graphics engine for displaying a logical representation and real-time status of a routed and switched network. The network is displayed as a combination of devices and their interconnections. These are drawn using two dimensional vector graphics techniques as found in much of the classic Computer Graphics literature. Thus the placement, scaling, and rotation is completely dependent upon the users preferences as these can be altered using various interactive devices such as the keyboard and the mouse.

Each device on the network is represented as a particular shape depending on the type of device. The shape encloses a rectangular window that is a detailed representation of the specific device itself The rectangular window background is used to indicate the particular state (or status) of the device.

Point to point connections are drawn as straight lines between devices. Line thickness is used to alternately display either maximum bandwidth, utilization, or utilization as a percentage of available bandwidth. Color is used to indicate status.

Circular ring connections such as Token Ring and FDDI are drawn as circles with short connecting lines from the edge of the circle to the attached device. Line thickness and color is used as above.

Devices residing on the same collision domain (hub, repeater, or coax Ethernet) are drawn as a thick horizontal pipe to which are connected the devices in that domain.

Radial Placement

The list of devices and their interconnections is initially placed with an unique radial placement algorithm. The purpose of the algorithm is to place a network of any size (thousands of devices and connections) in such a way as to be logical, practical, and aesthetically pleasing. The algorithm functions as follows: First a device is chosen to be at the center of the network. The choice can be made by the program such that a device is found which is a router and which is itself adjacent (directly connected) to high function switches or other routers, or the user can select any device or ring (FDDI or Token Ring). The angular area (360 degrees) around this central node is then divided into equal angular portions depending upon the number of devices connected (in radians this means $2\pi/N$ where N is the number of devices). Each device that is connected to this central router is queried and asked to compute its radial placement needs. It also divides its angular space among the devices that are connected to it and asks them as well. This proceeds on until the end of the network is reached. All the devices report back the size of the circle required (measured as radius) that it needs to adequately be placed such that it does not lay on top any other device.

Based on the radius required, the device is then placed such that the distance along with the available angle, will precisely conform with the other devices. In other words, $dx=r\times\cos(a)$, $dy=r\times\sin(a)$. The result is such that devices with many connections are placed at greater distances away from other devices with many connections (the more connections, the greater the distance due to greater radial space required), while devices with fewer connections are placed closer. Thus the router in the center of a LAN inside a particular building appears in the center of its radial cluster, and the router in another building appears far from the first and surrounded by its own cluster. Thus, the criterion of logical placement is satisfied by virtue of the greater radial needs of devices with many connections being placed far from other such devices, while those that have fewer are placed closer. The criterion of practicality is satisfied because the placement algorithm is not particularly compute intensive. And the criterion of aesthetic pleasure is satisfied because the result is very similar to how a user typically arranges his topological design by hand.

Interactive Submap Creation

The network topology described above we refer to as a map. The user has the ability to move devices and groups of devices around to satisfy his/her personal needs or desires. In addition, the user has the ability to interactively collapse any section of the map to create what we call a submap. The submap takes on the size of a single device, but with a unique shape. The user can select the submap and replace the current view with its contents (i.e. he can "enter" or view the submap). Also, the user may explode a previously created submap (thus eliminating the submap and replacing it with all of the devices and connections that previously were contained therein). Submaps can contain submaps. Thus, the user is free to create a hierarchy of limitless depth to suit his/her needs, if such a representation is desirable. In addition, the user can substitute a custom vector representation of a submap for the default. This vector representation is in a popular vector format and can be created using one of many two dimensional CAD software products.

Map Subset Creation and Display

The network topology view (or Map) is used to show subsets (or different logical views) of the network as they appear within. The logical operator AND is used on the map and the subset. The result is a subset of the topology map can be shown in contrast to the whole. other subsets can also be combined together on the same mater topology. Color is used as the primary visualization mechanism to show which parts of the map are of a particular subset, and which are not (that which is not is colored in a hue and saturation close to that of the background). Subsets of subsets can be created in any logical combination. So, if the user wants to see a particular path trace from one node to another, as well as a specific virtual LAN, AND a spanning tree, he can see all these subsets of the network simultaneously, distinguished by color and shade, as well as their intersections.

Multiple Graphics Display Lists and Multi-level Hash

Because networks can easily consist of thousands of devices, and because the representation of the network according to the invention allows the placement of all devices and connections on a single two dimensional plane, graphics performance of sufficient magnitude is required to allow the user to navigate the map with speed and ease. To that end, several display lists are used, each with a specific structure geared to its specific purpose. First, there is the linear display list consisting of all the devices in a single vector array. Then, there is a single vector array consisting only of the elements which are visible in a particular view (updated whenever the view is change). Thirdly, there is a multi-level hash list which uses a rectangular bounding area as the hash key. This allows the program to very quickly find any element in the view which the user either selects or passes over with the mouse. The hash is multi level so that it can accommodate massive numbers of nodes and yet require only a few comparisons to find the object in question.

The features described in the abstract, the patent claims, the description and those features presented in the drawings can prove essential both singly and in arbitrary combinations to the realization of the invention.

While specific embodiments of the invention have been shown and described in detail to illustrate the application of the principles of the invention, it will be understood that the invention may be embodied otherwise without departing from such principles.

What is claimed is:

1. A method for viewing a configuration of a computer network, the method comprising:

providing a plurality of workstations communicating by frames and packets though a plurality of links connected to a plurality of switches and a plurality of routers, each of said plurality of switches having a MAC database storing information regarding the quantity of frames received by a respective said switch and indicating where a frame received on one of said links of said respective switch is transferred to another of said links of a respective said switch, said packets having an IP address of a destination workstation, each of said plurality of routers having an IP database storing information regarding the quantity of packets received by a respective said router and indicating onto which of said links a received packet having a specific IP address is to be transferred to;

polling said plurality of switches and routers to obtain copies of each of said MAC and IP lookup tables;

combining said polled lookup tables;

determining from said combined lookup tables a status of each of said links, said switches and said routers;

graphically displaying said plurality of workstations, links, switches and routers according to physical connectivity and status, each status being displayed differently.

2. A method in accordance with claim 1, further comprising:

determining a critical path of said packets from one of said workstations to another of said workstations;

displaying said critical path.

3. A method in accordance with claim 2, further comprising:

displaying said critical path with said displaying of said physical connectivity and status.

4. A method in accordance with claim 3, wherein:

each of said plurality of routers has a IP address lookup table indicating onto which of said links a packet having a specific IP address is to be transferred to, said each routers having multicast means for receiving a multicast packet on one of said links and forwarding said multicast packet to a subset of said links according to a multicast tree table;

polling is performed on said plurality of routers to obtain copies of each of said IP lookup tables, and said multicast tree tables;

said polled multicast tree tables are combined to determine a presence and content of any existing multicast trees;

graphically displaying said contents of said any existing multicast trees with said displaying of said physical connectivity and status.

5. A method in accordance with claim 3, wherein:

said plurality of switches have a plurality of said links between themselves, said plurality of switches operate a spanning tree protocol to individually activate and deactivate said plurality of links between said switches, each of said plurality of switches having a MAC address lookup table indicating where a frame received on one of said links is transferred to another of said links;

polling said plurality of switches to obtain copies of each of said MAC lookup tables;

combining said polled MAC lookup tables;

determining from said combined MAC lookup tables which of said links are activated and deactivated;

displaying said activated links differently than said deactivated links with said displaying of said physical connectivity and status.

6. A method in accordance with claim 3, wherein:

said plurality of switches have a plurality of said links between themselves, each of said plurality of switches having an address MAC lookup table indicating where a frame received on one of said links is transferred to another of said links, a subset of said plurality of links being combined by said switches and said MAC lookup table into a trunk line transferring data in parallel over said subset of links;

polling said plurality of switches to obtain copies of each of said MAC lookup tables;

combining said polled MAC lookup tables;

determining from said combined MAC lookup tables which of said links are formed into said trunk line;

displaying said trunk line differently than said links and with said displaying of said physical connectivity and status.

7. A method in accordance with claim 3, wherein:

a subset of said workstations communicate through said switches according to a ring protocol, each of said plurality of switches having an address MAC lookup table indicating where a frame received on one of said links is transferred to another of said links according to said ring protocol;

polling said plurality of switches to obtain copies of each of said MAC lookup tables;

combining said polled MAC lookup tables;

determining from said combined MAC lookup tables which of said workstations are in said subset and are participating in said ring protocol;

displaying said subset of workstations as a ring with said displaying of said physical connectivity and status.

8. A method in accordance with claim 1, wherein:

each of said plurality of routers has a IP address lookup table indicating onto which of said links a packet having a specific IP address is to be transferred to, said each routers having multicast means for receiving a multicast packet on one of said links and forwarding said multicast packet to a subset of said links according to a multicast tree table;

polling is performed on said plurality of routers to obtain copies of each of said IP lookup tables, and said multicast tree tables;

said polled multicast tree tables are combined to determine a presence and content of any existing multicast trees;

graphically displaying said contents of said any existing multicast trees.

9. A method in accordance with claim 8, further comprising:

displaying said any existing multicast trees with said displaying of said physical connectivity and status.

10. A method in accordance with claim 9, wherein:

said plurality of switches have a plurality of said links between themselves, said plurality of switches operate a spanning tree protocol to individually activate and deactivate said plurality of links between said switches, each of said plurality of switches having a MAC address lookup table indicating where a frame received on one of said links is transferred to another of said links;

polling said plurality of switches to obtain copies of each of said MAC lookup tables;

combining said polled MAC lookup tables;

determining from said combined MAC lookup tables which of said links are activated and deactivated;

displaying said activated links differently than said deactivated links with said displaying of said physical connectivity and status.

11. A method in accordance with claim 9, wherein:

said plurality of switches have a plurality of said links between themselves, each of said plurality of switches having an address MAC lookup table indicating where a frame received on one of said links is transferred to another of said links, a subset of said plurality of links being combined by said switches and said MAC lookup table into a trunk line transferring data in parallel over said subset of links;

polling said plurality of switches to obtain copies of each of said MAC lookup tables;

combining said polled MAC lookup tables;

determining from said combined MAC lookup tables which of said links are formed into said trunk line;

displaying said trunk line differently than said links and with said displaying of said physical connectivity and status.

12. A method in accordance with claim 9, wherein:

a subset of said workstations communicate through said switches according to a ring protocol, each of said plurality of switches having an address MAC lookup table indicating where a frame received on one of said links is transferred to another of said links according to said ring protocol;

polling said plurality of switches to obtain copies of each of said MAC lookup tables;

combining said polled MAC lookup tables;

determining from said combined MAC lookup tables which of said workstations are in said subset and are participating in said ring protocol;

displaying said subset of workstations as a ring with said displaying of said physical connectivity and status.

13. A method in accordance with claim 1, wherein:

said plurality of switches have a plurality of said links between themselves, said plurality of switches operate a spanning tree protocol to individually activate and deactivate said plurality of links between said switches, each of said plurality of switches having a MAC address lookup table indicating where a frame received on one of said links is transferred to another of said links;

polling said plurality of switches to obtain copies of each of said MAC lookup tables;

combining said polled MAC lookup tables;

determining from said combined MAC lookup tables which of said links are activated and deactivated;

displaying said activated links differently than said deactivated links.

14. A method in accordance with claim 13, further comprising:

displaying said activated links and deactivated links with said displaying of said physical connectivity and status.

15. A method in accordance with claim 13, further comprising:

determining from said combined MAC lookup tables which of said plurality of switches is participating in said spanning tree protocol;

displaying said switches participating in said spanning tree protocol differently than said switches not participating in said spanning tree protocol;

determining from said combined MAC lookup tables which bridges of said plurality of switches are participating in said spanning tree protocol, and a port number of said bridges participating in said spanning tree protocol;

displaying said bridges participating in said spanning tree protocol with said port number and in a different manner than bridges not participating in said spanning tree protocol.

16. A method in accordance with claim 13, further comprising:

identifying broadcast storms from said combined MAC lookup tables;

displaying locations of said broadcast storms.

17. A method in accordance with claim 13, further comprising:

identifying and displaying a rate of reconfiguration of said links above a predetermined value;

identifying and displaying trunking ports in an spanning tree protocol blocking state;

identifying and displaying an optimum root node;

identifying and displaying choke points.

18. A method in accordance with claim 14, wherein:

a subset of said plurality of links are combined by said switches and said MAC lookup table into a trunk line transferring data in parallel over said subset of links;

determining from said combined MAC lookup tables which of said links are formed into said trunk line;

displaying said trunk line differently than said links with said displaying of said physical connectivity and status.

19. A method in accordance with claim 18, further comprising:

determining a critical path of said packets from one of said workstations to another of said workstations;

displaying said critical path with said displaying of said physical connectivity and status.

20. A method in accordance with claim 18, wherein:

each of said plurality of routers has a IP address lookup table indicating onto which of said links a packet having a specific IP address is to be transferred to, said each routers having multicast means for receiving a multicast packet on one of said links and forwarding said multicast packet to a subset of said links according to a multicast tree table;

polling is performed on said plurality of routers to obtain copies of each of said IP lookup tables, and said multicast tree tables;

said polled multicast tree tables are combined to determine a presence and content of any existing multicast trees;

graphically displaying said contents of said any existing multicast trees with said displaying of said physical connectivity and status.

21. A method in accordance with claim 20, further comprising:

determining a critical path of said packets from one of said workstations to another of said workstations;

displaying said critical path with said displaying of said physical connectivity and status.

22. A method in accordance with claim 1, wherein:

said plurality of switches have a plurality of said links between themselves, each of said plurality of switches having an address MAC lookup table indicating where a frame received on one of said links is transferred to another of said links, a subset of said plurality of links being combined by said switches and said MAC lookup table into a trunk line transferring data in parallel over said subset of links;

polling said plurality of switches to obtain copies of each of said MAC lookup tables;

combining said polled MAC lookup tables;

determining from said combined MAC lookup tables which of said links are formed into said trunk line;

displaying said trunk line differently than said links.

23. A method in accordance with claim 22, further comprising:

displaying said trunk line with said displaying of said physical connectivity and status.

24. A method in accordance with claim 22, further comprising:

identifying in said displaying each of said subset links in said trunk line;

displaying a status of said trunk line, and a status of each of said subset links in said trunk line;

displaying utilization of said trunk line and utilization of each of said subset links;

detecting and displaying misconfiguration of said trunk line.

* * * * *